(12) United States Patent
Luick

(10) Patent No.: US 8,135,941 B2
(45) Date of Patent: Mar. 13, 2012

(54) VECTOR MORPHING MECHANISM FOR MULTIPLE PROCESSOR CORES

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/233,729

(22) Filed: Sep. 19, 2008

(65) Prior Publication Data

US 2010/0077177 A1    Mar. 25, 2010

(51) Int. Cl.
*G06F 15/00* (2006.01)
*G06F 15/76* (2006.01)

(52) U.S. Cl. ............................. 712/43; 712/15; 712/13

(58) Field of Classification Search ............... 712/13
See application file for complete search history.

(56) References Cited

U.S. PATENT DOCUMENTS

| | | | |
|---|---|---|---|
| 5,896,505 A * | 4/1999 | Shimazaki | 709/213 |
| 6,026,479 A | 2/2000 | Fisher et al. | |
| 6,272,616 B1 | 8/2001 | Fernando et al. | |
| 6,480,938 B2 | 11/2002 | Vondran, Jr. | |
| 6,549,986 B1 * | 4/2003 | Spence | 711/125 |
| 6,944,744 B2 | 9/2005 | Ahmed et al. | |
| 6,983,388 B2 * | 1/2006 | Kaxiras et al. | 713/324 |
| 7,379,374 B2 * | 5/2008 | Tran | 365/230.03 |
| 7,734,895 B1 * | 6/2010 | Agarwal et al. | 712/13 |
| 2002/0169942 A1 * | 11/2002 | Sugimoto | 712/24 |
| 2005/0071694 A1 | 3/2005 | Gonzalez et al. | |
| 2006/0259741 A1 | 11/2006 | Hastie | |
| 2007/0294507 A1 | 12/2007 | Veidenbaum et al. | |
| 2008/0229065 A1 | 9/2008 | Le et al. | |

OTHER PUBLICATIONS

Office Action History from abandoned U.S. Appl. No. 12/030,231 dated Jul. 9, 2009.
Office Action History from U.S. Appl. No. 12/030,252 dated Sep. 1, 2010.
U.S. Appl. No. 12/030,231, filed Feb. 13, 2008.
U.S. Appl. No. 12/030,252, filed Feb. 13, 2008.
Office Action history of US Appl. No. 12/030,252, dates ranging from Dec. 22, 2010-Mar. 7, 2011.

* cited by examiner

*Primary Examiner* — Eddie P Chan
*Assistant Examiner* — George Giroux
(74) *Attorney, Agent, or Firm* — Patterson & Sheridan LLP

(57) ABSTRACT

One embodiment of the invention provides a processor. The processor generally includes a first and second processor core, each having a plurality of pipelined execution units for executing an issue group of multiple instructions and scheduling logic configured to issue a first issue group of instructions to the first processor core for execution and a second issue group of instructions to the second processor core for execution when the processor is in a first mode of operation and configured to issue one or more vector instructions for concurrent execution on the first and second processor cores when the processor is in a second mode of operation.

20 Claims, 28 Drawing Sheets

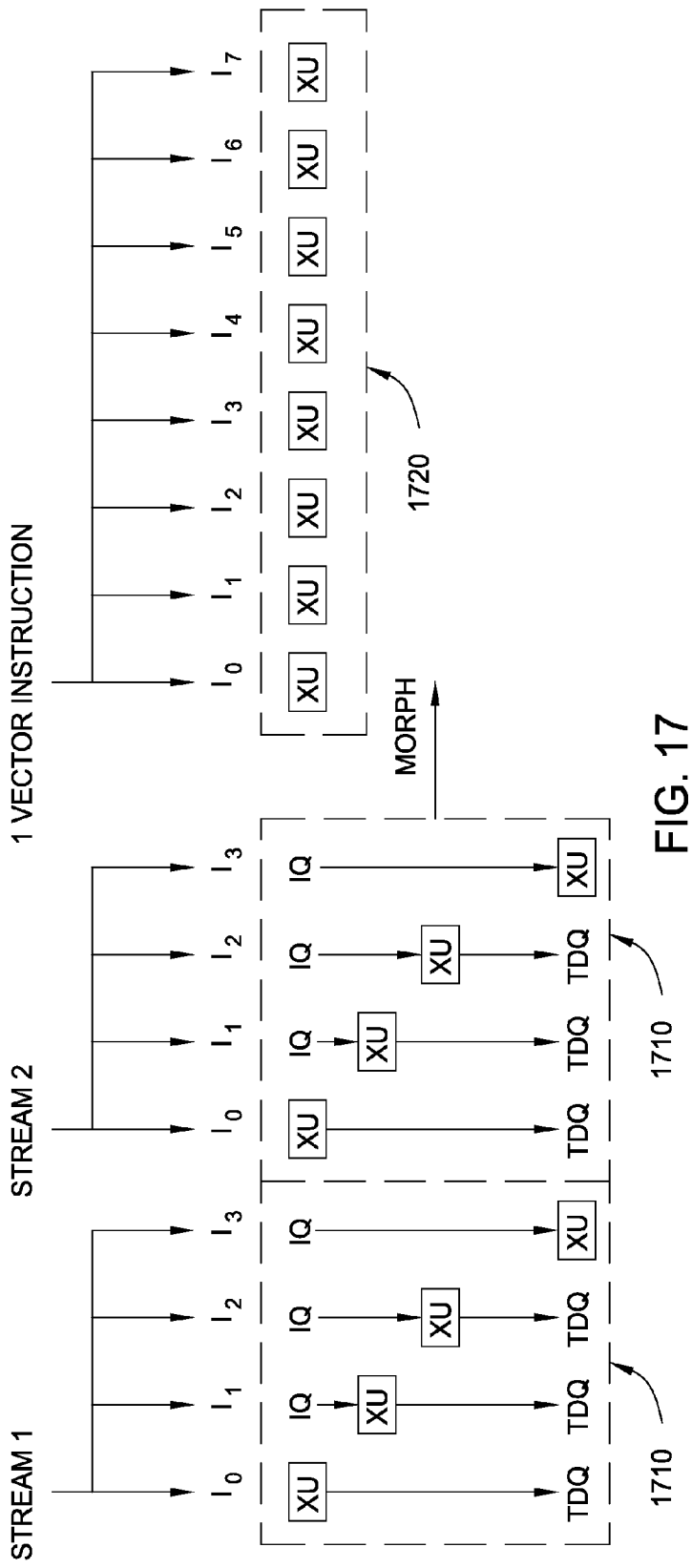

VECTOR MORPHING MECHANISM FOR MULTIPLE PROCESSOR CORES

BACKGROUND OF THE INVENTION

1. Field of the Invention

The present invention generally relates to pipelined processors and, more particularly, to processors utilizing a cascaded arrangement of execution units that are delayed with respect to each other.

2. Description of the Related Art

Computer systems typically contain several integrated circuits (ICs), including one or more processors used to process information in the computer system. Modern processors often process instructions in a pipelined manner, executing each instruction as a series of steps. Each step is typically performed by a different stage (hardware circuit) in the pipeline, with each pipeline stage performing its step on a different instruction in the pipeline in a given clock cycle. As a result, if a pipeline is fully loaded, an instruction is processed each clock cycle, thereby increasing throughput.

As a simple example, a pipeline may include three stages: load (read instruction from memory), execute (execute the instruction), and store (store the results). In a first clock cycle, a first instruction enters the pipeline load stage. In a second clock cycle, the first instruction moves to the execution stage, freeing up the load stage to load a second instruction. In a third clock cycle, the results of executing the first instruction may be stored by the store stage, while the second instruction is executed and a third instruction is loaded.

Unfortunately, due to dependencies inherent in a typical instruction stream, conventional instruction pipelines suffer from stalls (with pipeline stages not executing) while an execution unit to execute one instruction waits for results generated by execution of a previous instruction. As an example, a load instruction may be dependent on a previous instruction (e.g., another load instruction or addition of an offset to a base address) to supply the address of the data to be loaded. As another example, a multiply instruction may rely on the results of one or more previous load instructions for one of its operands. In either case, a conventional instruction pipeline would stall until the results of the previous instruction are available. Stalls can be for several clock cycles, for example, if the previous instruction (on which the subsequent instruction is dependent) targets data that does not reside in an L1 cache (resulting in an L1 "cache miss") and a relatively slow L2 cache must be accessed. As a result, such stalls may result in a substantial reduction in performance due to underutilization of the pipeline.

Accordingly, what is needed is an improved mechanism of pipelining instructions, preferably that reduces stalls.

SUMMARY OF THE INVENTION

Embodiments of the invention provide an apparatus for the execution of vector instruction.

One embodiment of the invention provides a processor. The processor generally includes a first and second processor core, each having a plurality of pipelined execution units for executing an issue group of multiple instructions and scheduling logic configured to issue a first issue group of instructions to the first processor core for execution and a second issue group of instructions to the second processor core for execution when the processor is in a first mode of operation and configured to issue one or more vector instructions for concurrent execution on the first and second processor cores when the processor is in a second mode of operation.

Another embodiment of the invention provides a computing system. The computing system generally includes a first and second processor, each having a plurality of processor cores for executing one or more vector instructions and scheduling logic configured to issue one or more vector instructions to the first processor for execution and one or more vector instructions to the second processor for execution when the computing system is in a first mode of operation and configured to issue an issue group of vector instructions for execution to the first and second processor when the computing system is in a second mode of operation.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 17 illustrates an example of morphing physical cores for vector processing.

FIG. 18 illustrates another example of morphing physical cores for vector processing.

DETAILED DESCRIPTION OF THE PREFERRED EMBODIMENTS

Figure 1:
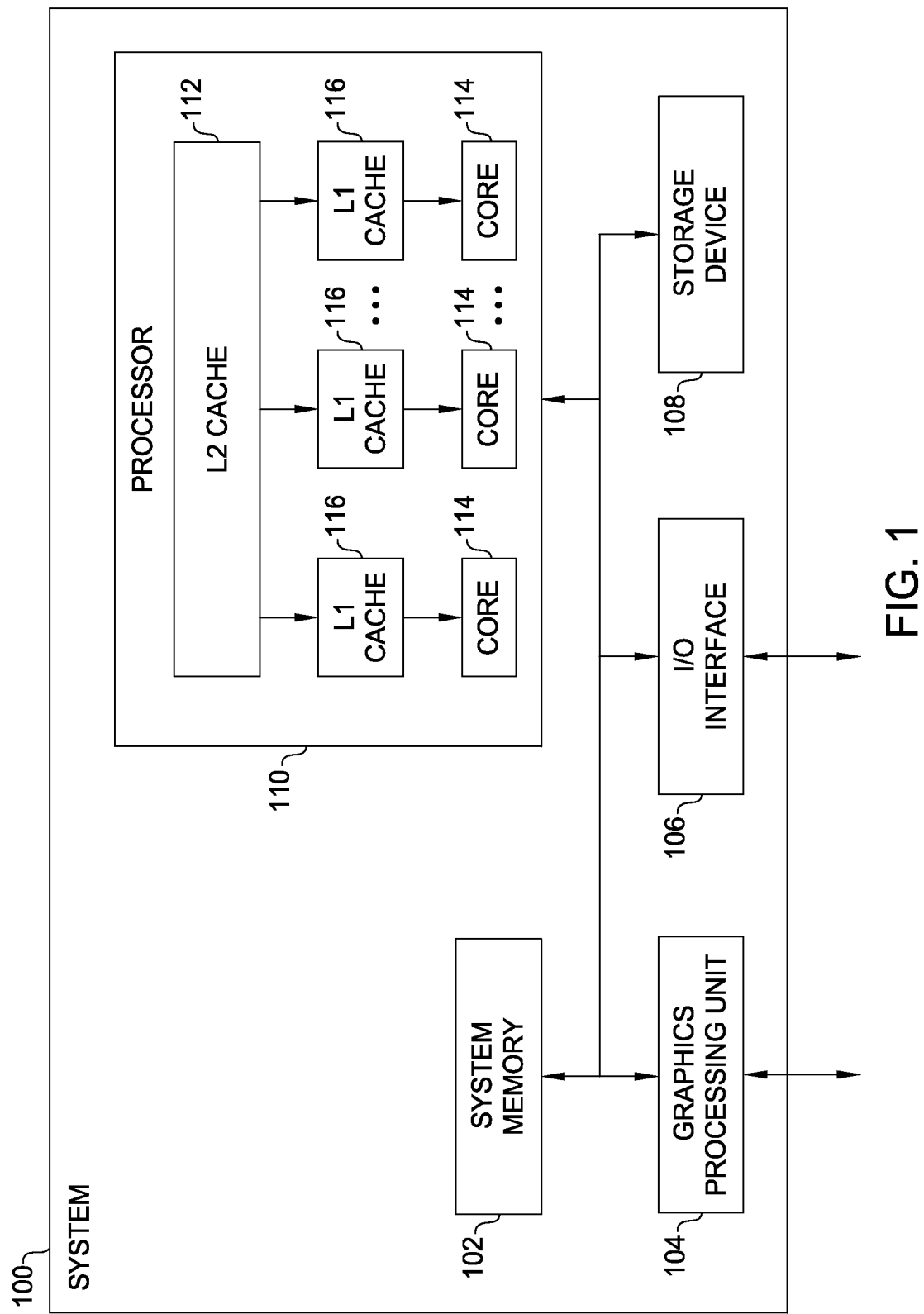
FIG. 1 is a block diagram depicting a system according to one embodiment of the invention.

The present invention generally provides an improved technique for executing instructions in a pipelined manner that may reduce stalls that occur when executing dependent instructions. Stalls may be reduced by utilizing a cascaded arrangement of pipelines with execution units that are delayed with respect to each other. This cascaded delayed arrangement allows dependent instructions to be issued within a common issue group by scheduling them for execution in different pipelines to execute at different times.

As an example, a first instructions may be scheduled to execute on a first "earlier" or "less-delayed" pipeline, while a second instruction (dependent on the results obtained by executing the first instruction) may be scheduled to execute on a second "later" or "more-delayed" pipeline. By scheduling the second instruction to execute in a pipeline that is delayed relative to the first pipeline, the results of the first instruction may be available just in time when the second instruction is to execute. While execution of the second instruction is still delayed until the results of the first instruction are available, subsequent issue groups may enter the cascaded pipeline on the next cycle, thereby increasing throughput. In other words, such delay is only "seen" on a first issue group and is "hidden" for subsequent issue groups, allowing a different issue group (even with dependent instructions) to be issued each pipeline cycle.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

Overview of an Exemplary System

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
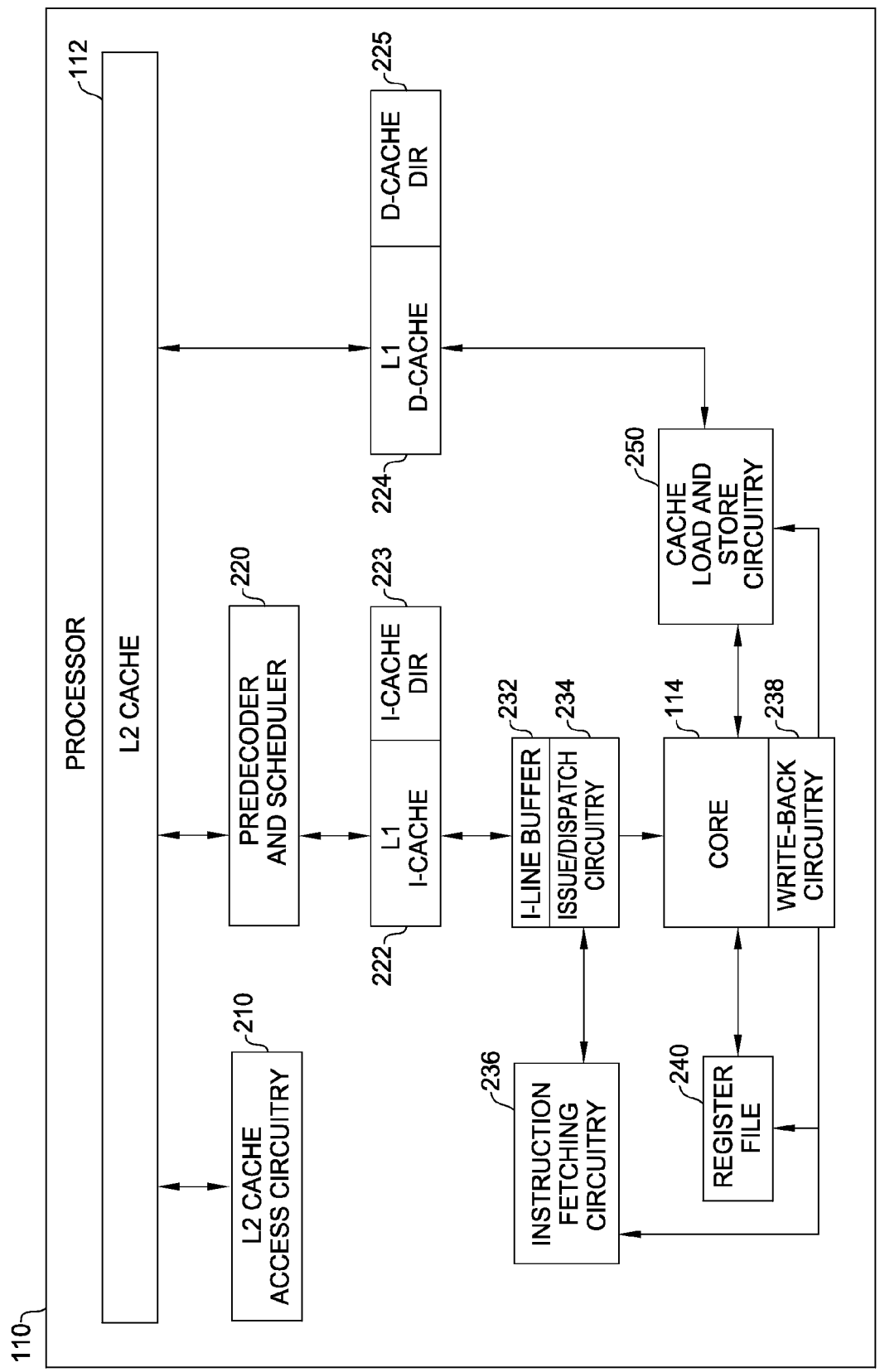
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., containing identical pipelines with the same arrangement of pipeline stages). For other embodiments, cores 114 may be different (e.g., containing different pipelines with different arrangements of pipeline stages).

In one embodiment of the invention, the L2 cache may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220.

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

In one embodiment of the invention, I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. For some embodiments, the predecoder (and scheduler) 220 may be shared among multiple cores 114 and L1 caches.

In addition to receiving instructions from the issue and dispatch circuitry 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) after the D-cache directory 225 is accessed but before the D-cache access is completed.

In some cases, data may be modified in the core 114. Modified data may be written to the register file, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Cascaded Delayed Execution Pipeline

Figure 3:
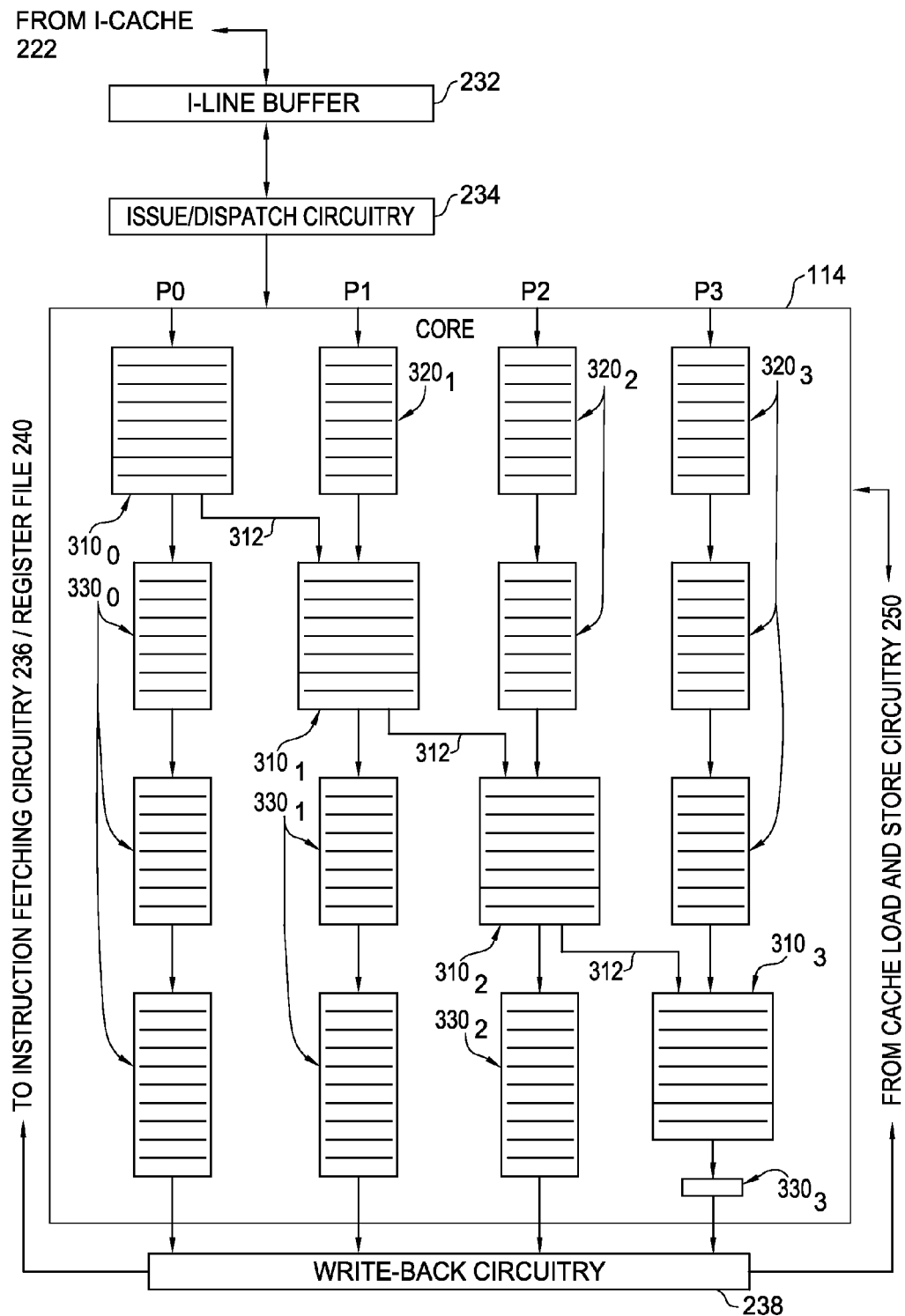
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may contain several pipeline stages which perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit may also read data from a register file, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. Instructions in a common issue group (e.g., instructions I0, I1, I2, and I3) may be issued in parallel to the pipelines P0, P1, P2, P3, with each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In such a configuration, where instructions in a group executed in parallel are not required to issue in program order (e.g., if no dependencies exist between instructions they may be issued to any pipe) all instruction groups are assumed to be executed in order for the previous examples. However, out of order execution across groups is also allowable for other exemplary embodiments. In out of order execution, the cascade delayed arrangement may still provide similar advantages. However, in some cases, it may be decided that one instruction from a previous group may not be executed with that group. As an example, a first group may have three loads (in program order: L1, L2, and L3), with L3 dependent on L1, and L2 not dependent on either. In this example, L1 and L3 may be issued in a common group (with L3 issued to a more delayed pipeline), while L2 may be issued "out of order" in a subsequent issue group.

In one embodiment, upon issuing the issue group to the processor core 114, I0 may be executed immediately in execution unit $310_0$. Later, after instruction I0 has finished being executed in execution unit $310_0$, execution unit $310_1$ may begin executing instruction I1, and so on, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions which are not being executed by an execution unit 310 (e.g., instructions being delayed) may be held in a delay queue 320 or a target delay queue 330. The delay queues 320 may be used to hold instructions in an instruction group which have not yet been executed by an execution unit 310. For example, while instruction I0 is being executed in execution unit $310_0$, instructions I1, I2 and I3 may be held in a delay queue 330. Once the instructions have moved through the delay queues 330, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 238 may be used to write back the most recently modified value of a register (received from one of the target delay queues 330) and discard invalidated results.

Performance of Cascaded Delayed Execution Pipelines

Figure 4A:
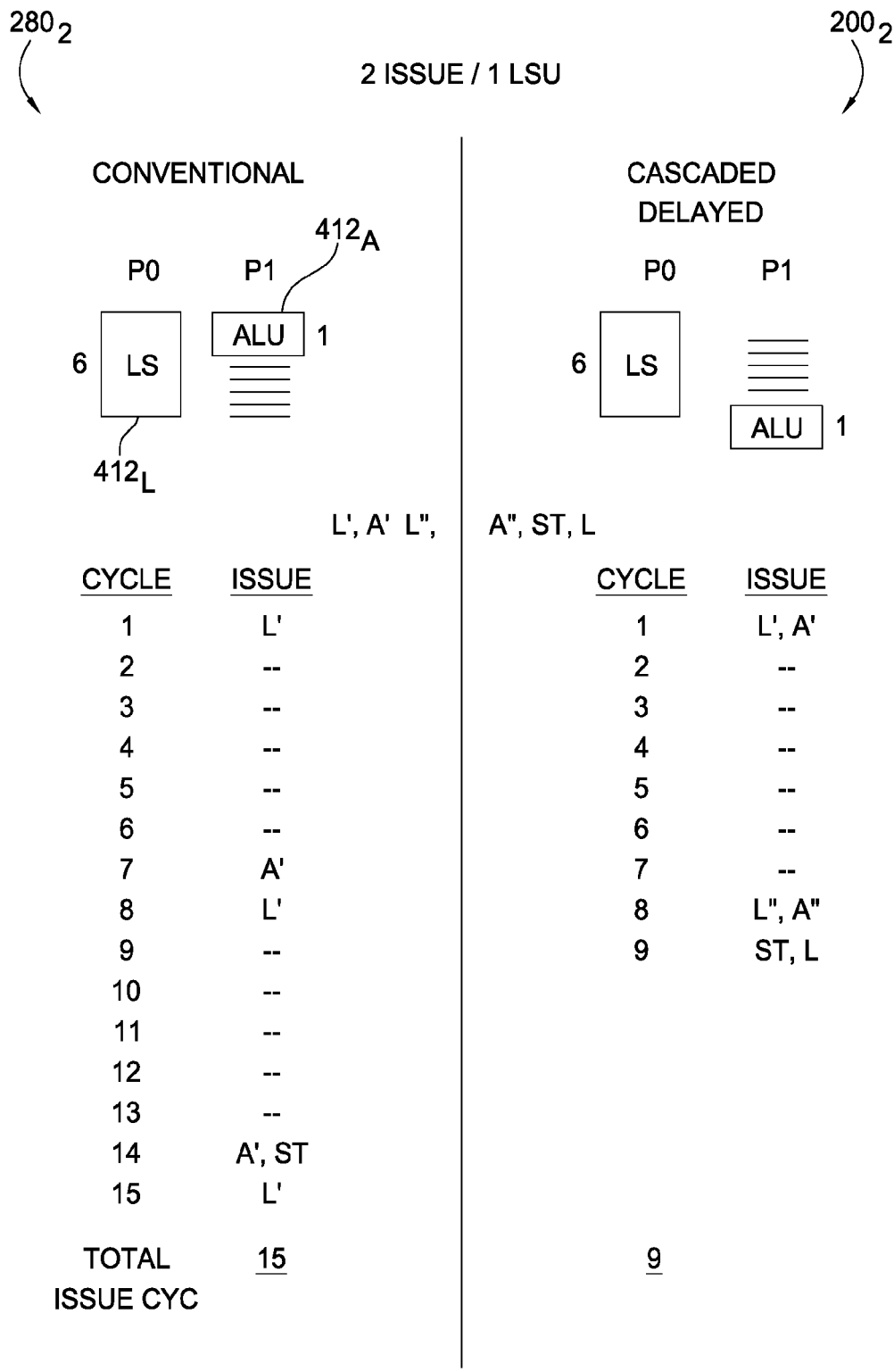
FIGS. 4A and 4B compare the performance of conventional pipeline units to pipeline units in accordance with embodiments of the present invention.
Figure 4B:
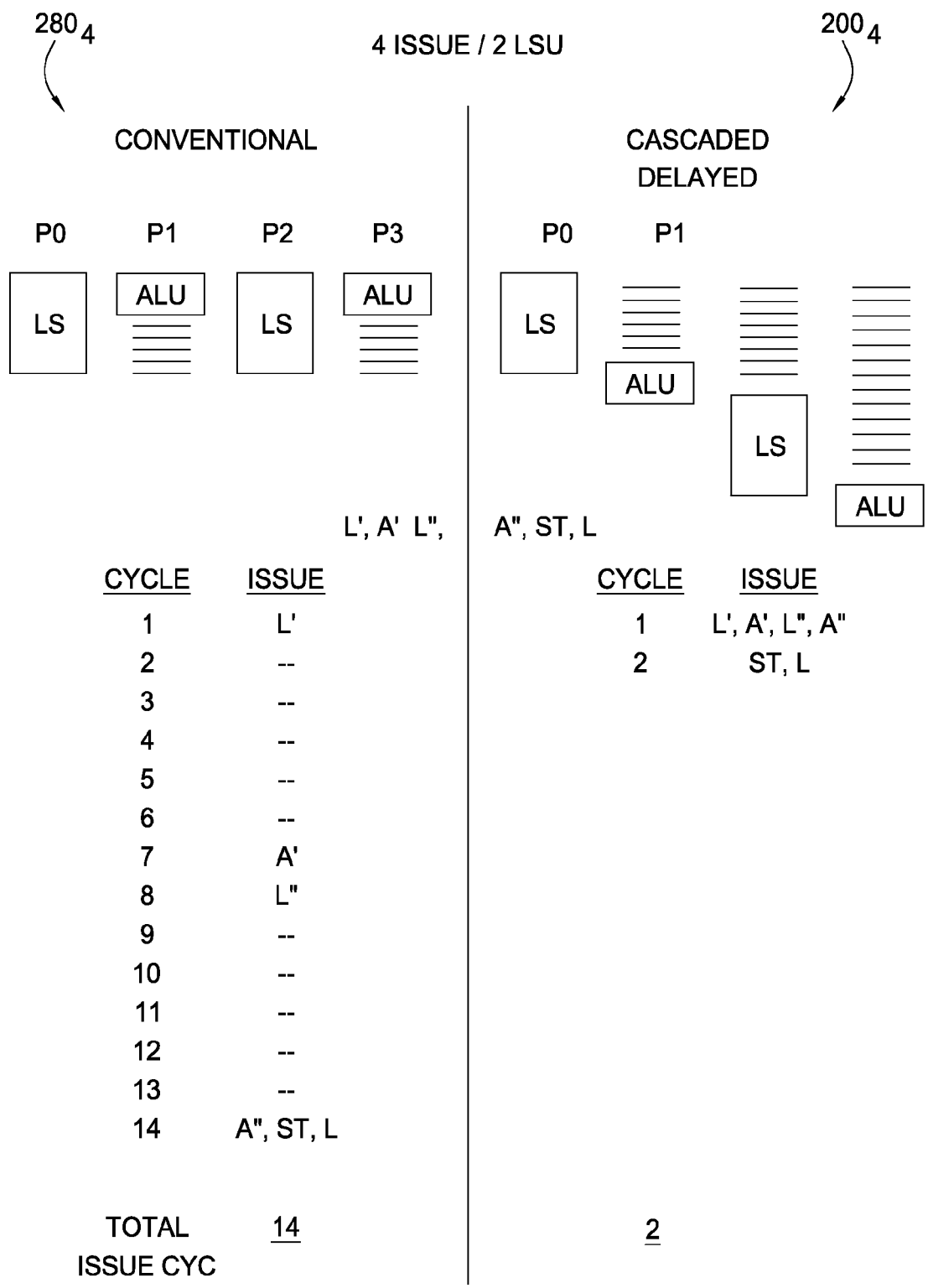

The performance impact of cascaded delayed execution pipelines may be illustrated by way of comparisons with conventional in-order execution pipelines, as shown in FIGS. 4A and 4B. In FIG. 4A, the performance of a conventional "2 issue" pipeline arrangement $280_2$ is compared with a cascaded-delayed pipeline arrangement $200_2$, in accordance with embodiments of the present invention. In FIG. 4B, the performance of a conventional "4 issue" pipeline arrangement $280_4$ is compared with a cascaded-delayed pipeline arrangement $200_4$, in accordance with embodiments of the present invention.

For illustrative purposes only, relatively simple arrangements including only load store units (LSUs) 412 and arithmetic logic units (ALUs) 414 are shown. However, those skilled in the art will appreciate that similar improvements in performance may be gained using cascaded delayed arrangements of various other types of execution units. Further, the performance of each arrangement will be discussed with respect to execution of an exemplary instruction issue group (L'-A'-L"-A"-ST-L) that includes two dependent load-add instruction pairs (L'-A' and L"-A"), an independent store instruction (ST), and an independent load instruction (L). In this example, not only is each add dependent on the previous load, but the second load (L") is dependent on the results of the first add (A').

Referring first to the conventional 2-issue pipeline arrangement $280_2$ shown in FIG. 4A, the first load (L') is issued in the first cycle. Because the first add (A') is dependent on the results of the first load, the first add cannot issue until the results are available, at cycle 7 in this example. Assuming the first add completes in one cycle, the second load (L"), dependent on its results, can issue in the next cycle. Again, the second add (A") cannot issue until the results of the second load are available, at cycle 14 in this example. Because the store instruction is independent, it may issue in the same cycle. Further, because the third load instruction (L) is independent, it may issue in the next cycle (cycle 15), for a total of 15 issue cycles.

Referring next to the 2-issue delayed execution pipeline $200_2$ shown in FIG. 4A, the total number of issue cycles may be significantly reduced. As illustrated, due to the delayed arrangement, with an arithmetic logic unit (ALU) $412_A$ of the second pipeline (P1) located deep in the pipeline relative to a load store unit (LSU) $412_L$ of the first pipeline (P0), both the first load and add instructions (L'-A') may be issued together, despite the dependency. In other words, by the time A' reaches ALU $412_A$, the results of the L' may be available and forwarded for use in execution of A', at cycle 7. Again assuming A' completes in one cycle, L" and A" can issue in the next cycle. Because the following store and load instructions are independent, they may issue in the next cycle. Thus, even without increasing the issue width, a cascaded delayed execution pipeline $200_2$ reduces the total number of issue cycles to 9.

Referring next to the conventional 4-issue pipeline arrangement $280_4$ shown in FIG. 4B, it can be seen that, despite the increase (×2) in issue width, the first add (A') still cannot issue until the results of the first load (L') are available, at cycle 7. After the results of the second load (L") are available, however, the increase in issue width does allow the second add (A") and the independent store and load instructions (ST and L) to be issued in the same cycle. However, this results in only marginal performance increase, reducing the total number of issue cycles to 14.

Referring next to the 4-issue cascaded delayed execution pipeline $200_4$ shown in FIG. 4B, the total number of issue cycles may be significantly reduced when combining a wider issue group with a cascaded delayed arrangement. As illustrated, due to the delayed arrangement, with a second arithmetic logic unit (ALU) $412_A$ of the fourth pipeline (P3) located deep in the pipeline relative to a second load store unit (LSU) $412_L$ of the third pipeline (P2), both load add pairs (L'-A' and L"-A") may be issued together, despite the dependency. In other words, by the time L" reaches LSU 412L of the third pipeline (P2), the results of A' will be available and by the time A" reaches ALU $412_A$ of the fourth pipeline (P3), the results of A" will be available. As a result, the subsequent store and load instructions may issue in the next cycle, reducing the total number of issue cycles to 2.

Scheduling Instructions in an Issue Group

Figure 5:
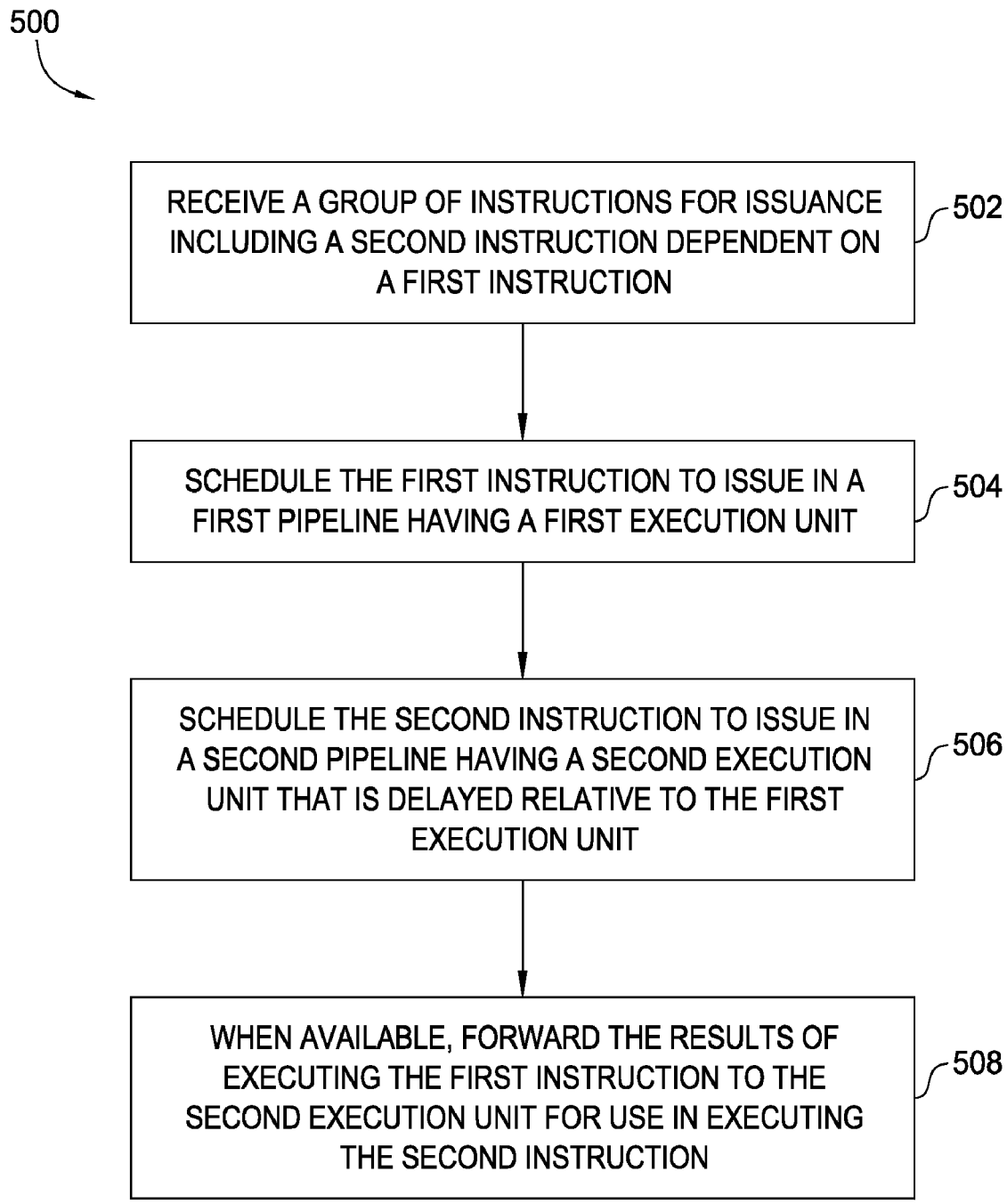
FIG. 5 illustrates an exemplary integer cascaded delayed execution pipeline unit in accordance with embodiments of the present invention.

FIG. 5 illustrates exemplary operations 500 for scheduling and issuing instructions with at least some dependencies for execution in a cascaded-delayed execution pipeline. For some embodiments, the actual scheduling operations may be performed in a predecoder/scheduler circuit shared between multiple processor cores (each having a cascaded-delayed execution pipeline unit), while dispatching/issuing instructions may be performed by separate circuitry within a processor core. As an example, a shared predecoder/scheduler may apply a set of scheduling rules by examining a "window" of instructions to issue to check for dependencies and generate a set of "issue flags" that control how (to which pipelines) dispatch circuitry will issue instructions within a group.

In any case, at step 502, a group of instructions to be issued is received, with the group including a second instruction dependent on a first instruction. At step 504, the first instruction is scheduled to issue in a first pipeline having a first execution unit. At step 506, the second instruction is scheduled to issue in a second pipeline having a second execution unit that is delayed relative to the first execution unit. At step 508 (during execution), the results of executing the first instruction are forwarded to the second execution unit for use in executing the second instruction.

The exact manner in which instructions are scheduled to different pipelines may vary with different embodiments and may depend, at least in part, on the exact configuration of the corresponding cascaded-delayed pipeline unit. As an example, a wider issue pipeline unit may allow more instructions to be issued in parallel and offer more choices for scheduling, while a deeper pipeline unit may allow more dependent instructions to be issued together.

Of course, the overall increase in performance gained by utilizing a cascaded-delayed pipeline arrangement will depend on a number of factors. As an example, wider issue width (more pipelines) cascaded arrangements may allow larger issue groups and, in general, more dependent instructions to be issued together. Due to practical limitations, such as power or space costs, however, it may be desirable to limit the issue width of a pipeline unit to a manageable number. For some embodiments, a cascaded arrangement of 4-6 pipelines may provide good performance at an acceptable cost. The overall width may also depend on the type of instructions that are anticipated, which will likely determine the particular execution units in the arrangement.

An Example Embodiment of an Integer Cascaded Delayed Execution Pipeline

Figure 6:
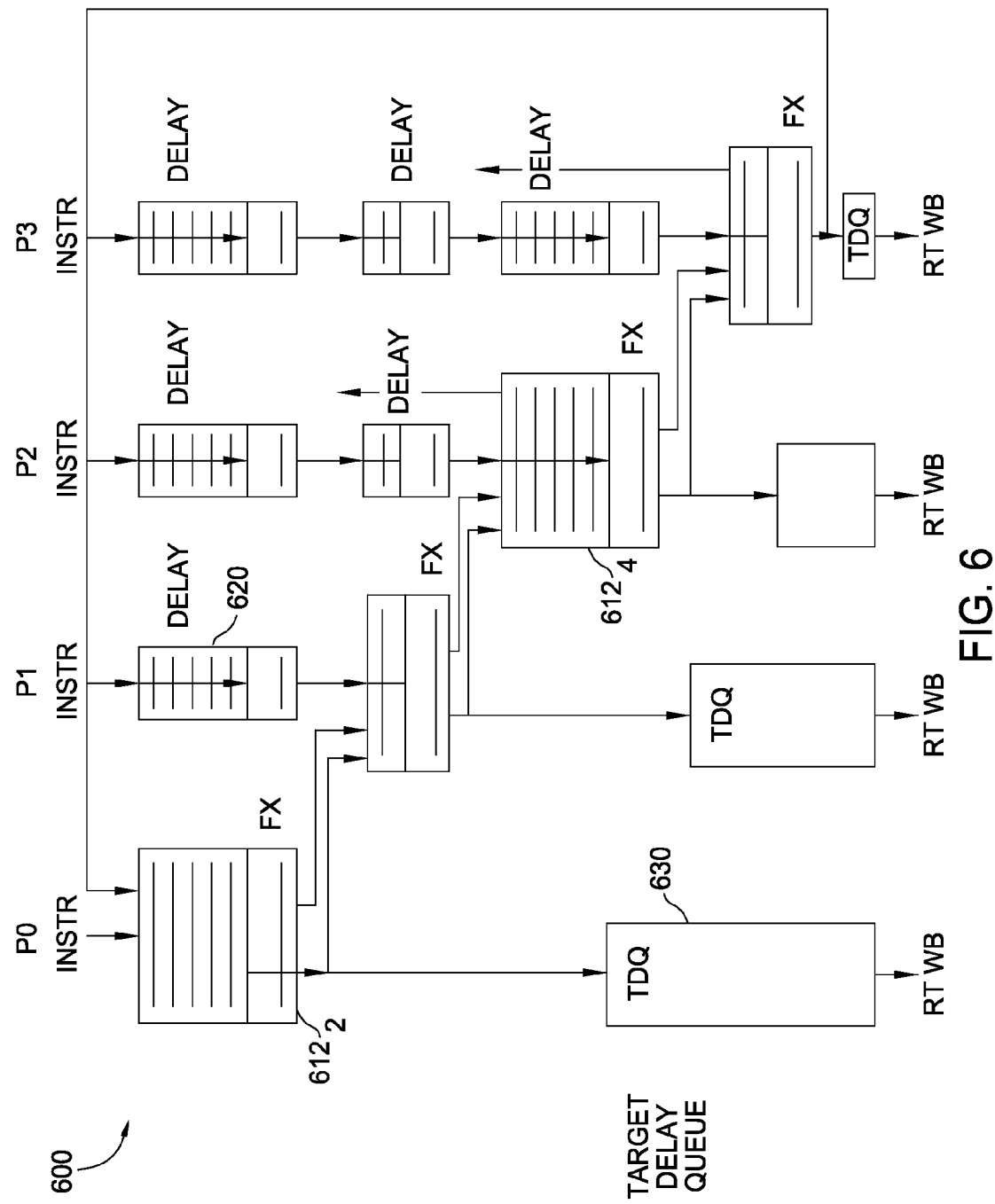
FIG. 6 is a flow diagram of exemplary operations for scheduling and issuing instructions in accordance with embodiments of the present invention.

FIG. 6 illustrates an exemplary arrangement of a cascaded-delayed execution pipeline unit 600 for executing integer instructions. As illustrated, the unit has four execution units, including two LSUs $612_L$ and two ALUs $614_A$. The unit 600 allows direct forwarding of results between adjacent pipelines. For some embodiments, more complex forwarding may be allowed, for example, with direct forwarding between non-adjacent pipelines. For some embodiments, selective forwarding from the target delay queues (TDQs) 630 may also be permitted.

FIGS. 7A-7D illustrate the flow of an exemplary issue group of four instructions (L'-A'-L"-A") through the pipeline unit 600 shown in FIG. 6. As illustrated, in FIG. 7A, the issue group may enter the unit 600, with the first load instruction (L') scheduled to the least delayed first pipeline (P0). As a result, L' will reach the first LSU 612L to be executed before the other instructions in the group (these other instructions may make there way down through instruction queues 620) as L' is being executed.

Figure 7A:
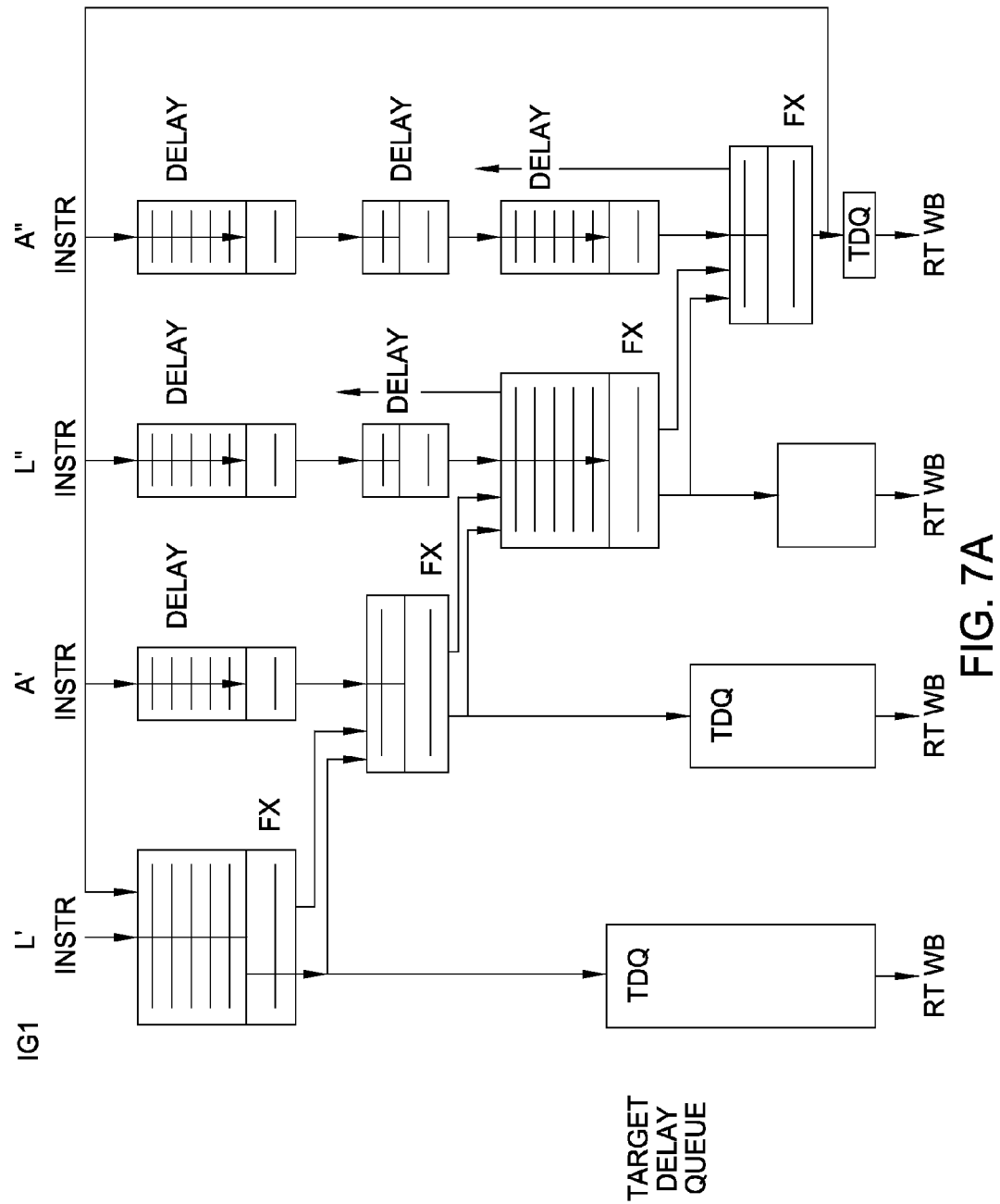
FIGS. 7A-7D illustrate the flow of instructions through the pipeline unit shown in FIG. 5.
Figure 7B:
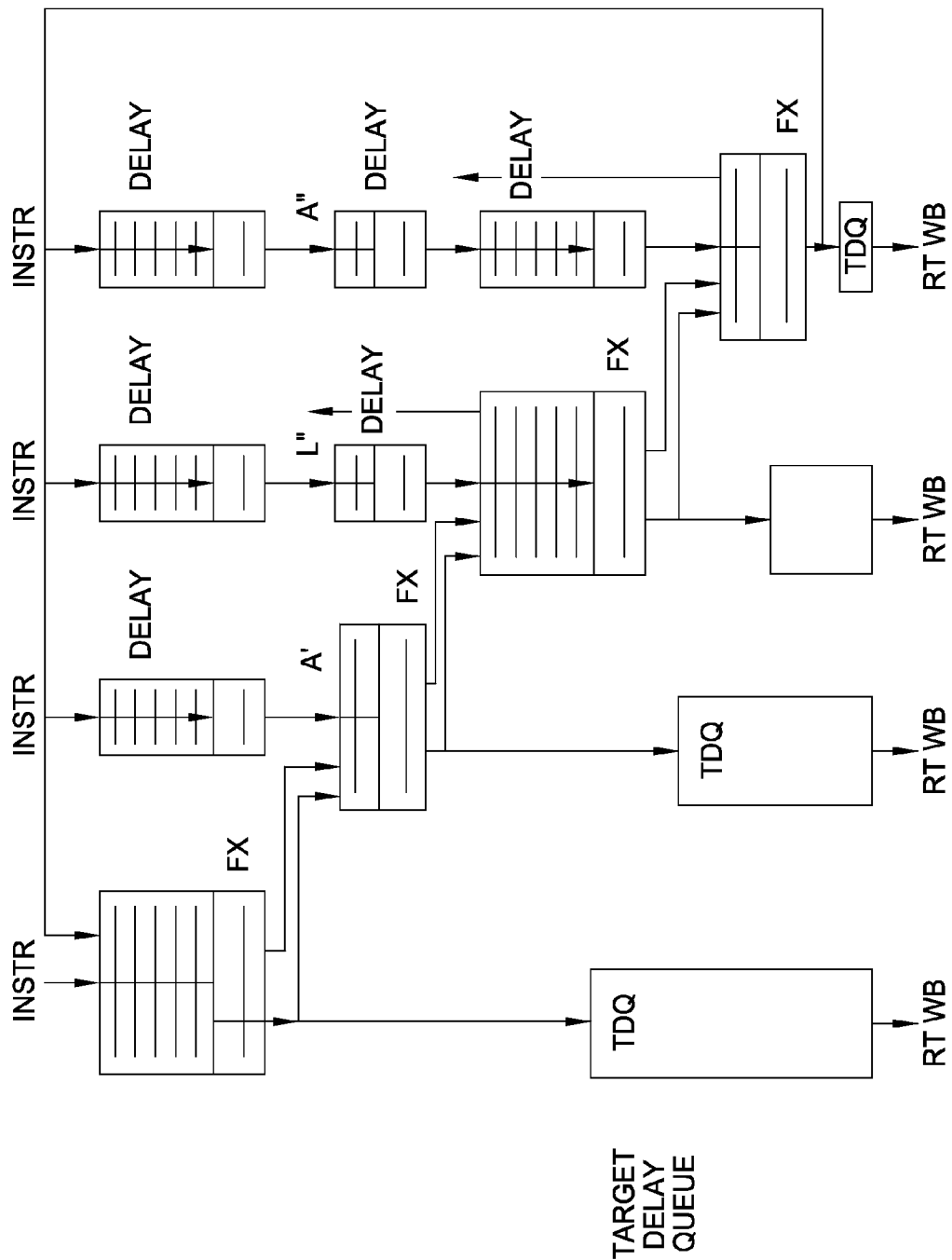

As illustrated in FIG. 7B, the results of executing the first load (L') may be available (just in time) as the first add A' reaches the first ALU 612A of the second pipeline (P1). In some cases, the second load may be dependent on the results of the first add instruction, for example, which may calculate by adding an offset (e.g., loaded with the first load L') to a base address (e.g., an operand of the first add A').

Figure 7C:
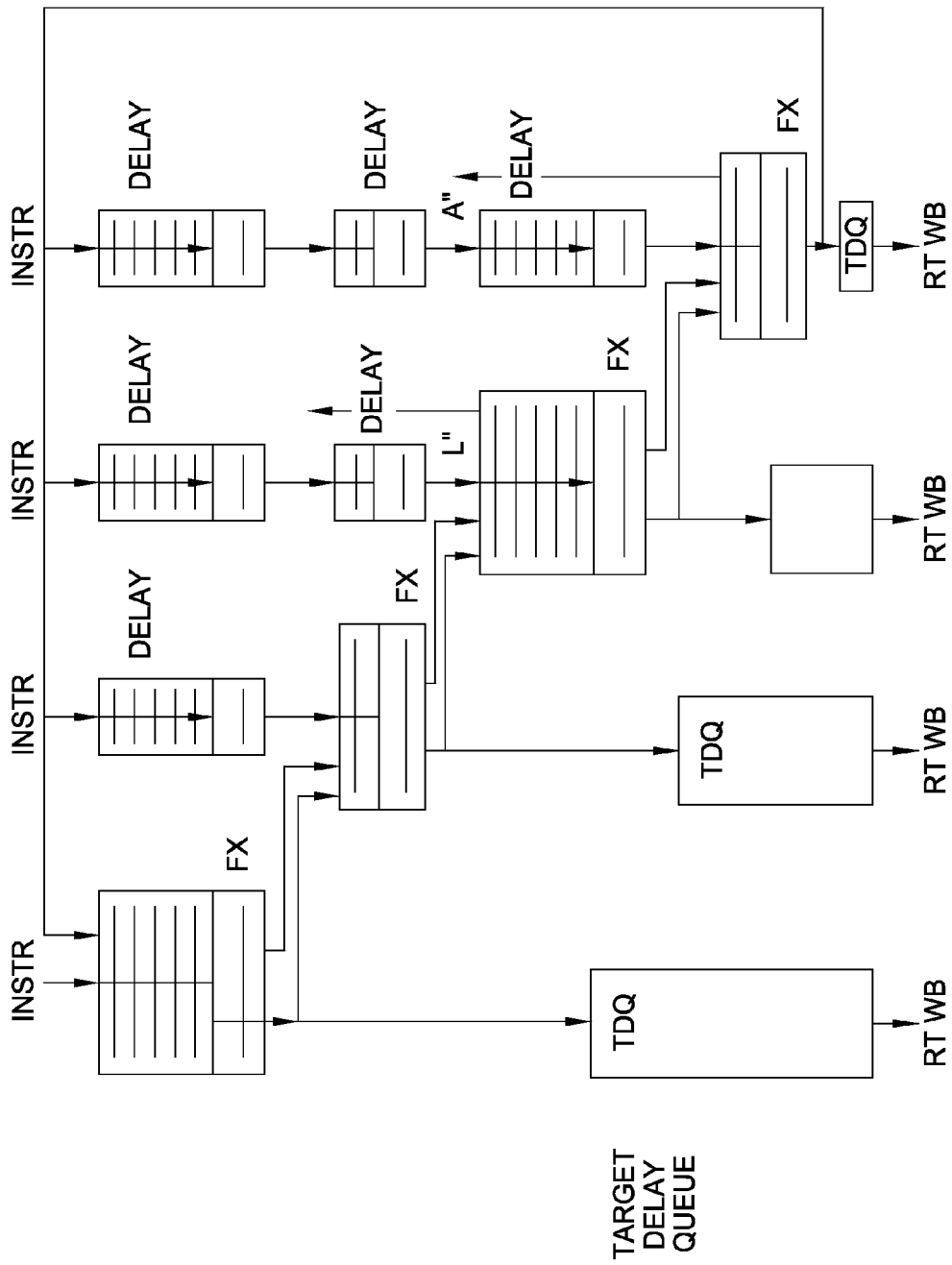
Figure 7D:
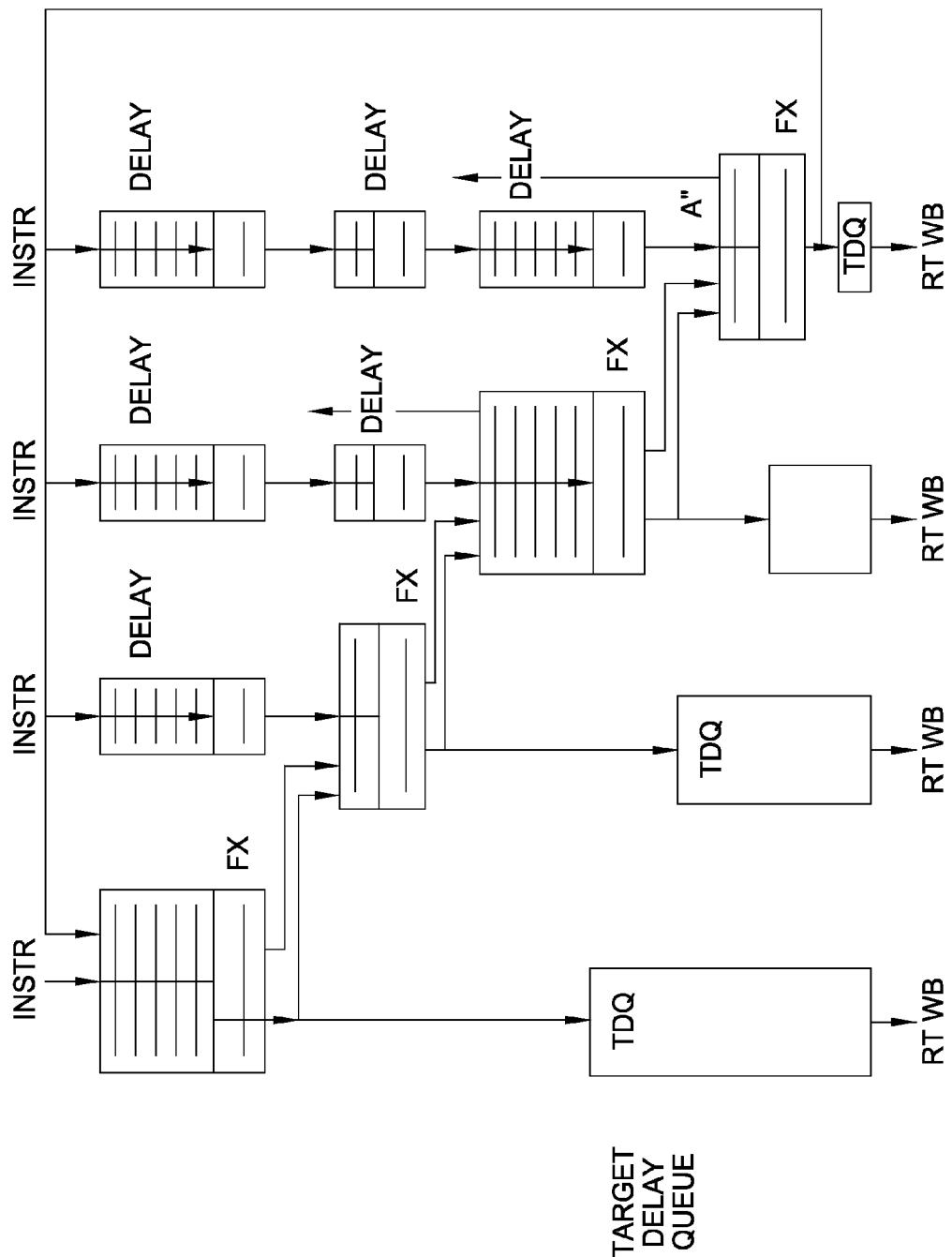

In any case, as illustrated in FIG. 7C, the results of executing the first add (A') may be available as the second load L" reaches the second LSU 612L of the third pipeline (P2). Finally, as illustrated in FIG. 7D, the results of executing the second load (L") may be available as the second add A" reaches the second ALU 612A of the fourth pipeline (P3). Results of executing instructions in the first group may be used as operands in executing the subsequent issue groups and may, therefore, be fed back (e.g., directly or via TDQs 630).

While not illustrated, it should be understood that each clock cycle a new issue groups may enter the pipeline unit 600. In some cases, for example, due to relatively rare instruction streams with multiple dependencies (L'-L"-L'''), each new issue group may not contain a maximum number of instructions (4 in this example), the cascaded delayed arrangement described herein may still provide significant improvements in throughput by allowing dependent instructions to be issued in a common issue group without stalls.

Example Embodiments of Floating Point/Vector Cascaded Delayed Execution Pipelines The concepts of cascaded, delayed, execution pipeline units presented herein, wherein the execution of one more instructions in an issue group is delayed relative to the execution of another instruction in the same group, may be applied in a variety of different configurations utilizing a variety of different types of functional units. Further, for some embodiments, multiple different configurations of cascaded, delayed, execution pipeline units may be included in the same system and/or on the same chip. The particular configuration or set of configurations included with a particular device or system may depend on the intended use.

The fixed point execution pipeline units described above allow issue groups containing relatively simple operations that take only a few cycles to complete, such as load, store, and basic ALU operations to be executed without stalls, despite dependencies within the issue group. However, it is also common to have at least some pipeline units that perform relatively complex operations that may take several cycles, such as floating point multiply/add (MADD) instructions, vector dot products, vector cross products, and the like.

In graphics code, such as that often seen in commercial video games, there tends to be a high frequency of scalar floating point code, for example, when processing 3D scene data to generate pixel values to create a realistic screen image. An example of an instruction stream may include a load (L), immediately followed by a first multiply/add (MADD) based on the load as an input, followed by a second MADD based on the results of the first MADD. In other words, the first MADD depends on the load, while the second MADD depends on the first MADD. The second MADD may be followed by a store to store the results generated by the second MADD.

Figure 8:
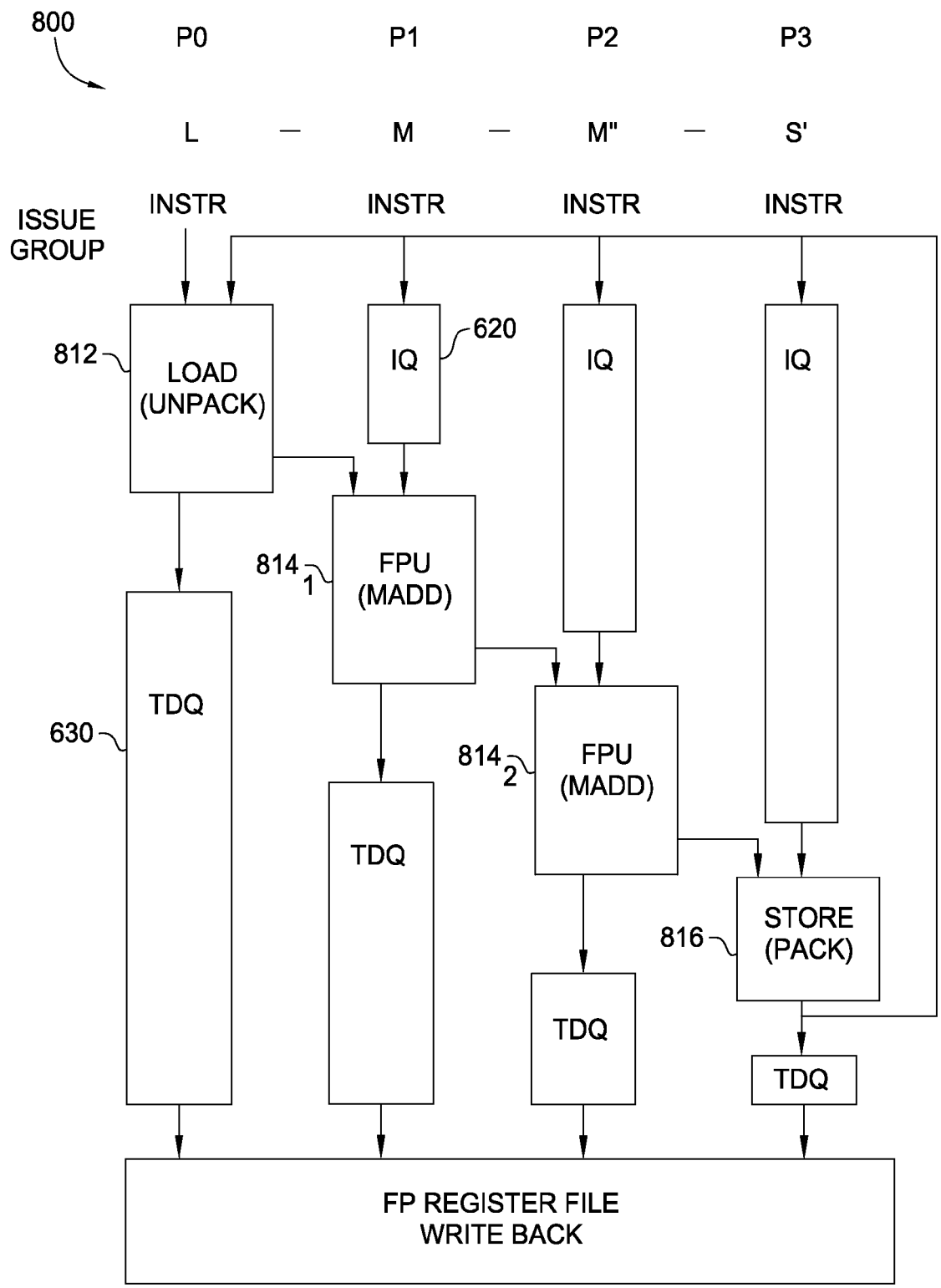
FIG. 8 illustrates an exemplary floating point cascaded delayed execution pipeline unit in accordance with embodiments of the present invention.

FIG. 8 illustrates a cascaded, delayed, execution pipeline unit 800 that would accommodate the example instruction stream described above, allowing the simultaneous issue of two dependent MADD instructions in a single issue group. As illustrated, the unit has four execution units, including a first load store unit (LSU) 812, two floating point units FPUs $814_1$ and $814_2$, and a second LSU 816. The unit 800 allows direct forwarding of the results of the load in the first pipeline (P0) to the first FPU $814_1$ in the second pipeline (P1) and direct forwarding of the results of the first MADD to the second FPU $814_1$.

FIGS. 9A-9D illustrate the flow of an exemplary issue group of four instructions (L'-M'-M"-S') through the pipeline unit 800 shown in FIG. 8 (with M' representing a first dependent multiply/add and M" representing a second multiply/add dependent on the results of the first). As illustrated, in FIG. 9A, the issue group may enter the unit 900, with the load instruction (L') scheduled to the least delayed first pipeline (P0). As a result, L' will reach the first LSU 812 to be executed before the other instructions in the group (these other instructions may make there way down through instruction queues 620) as L' is being executed.

Figure 9A:
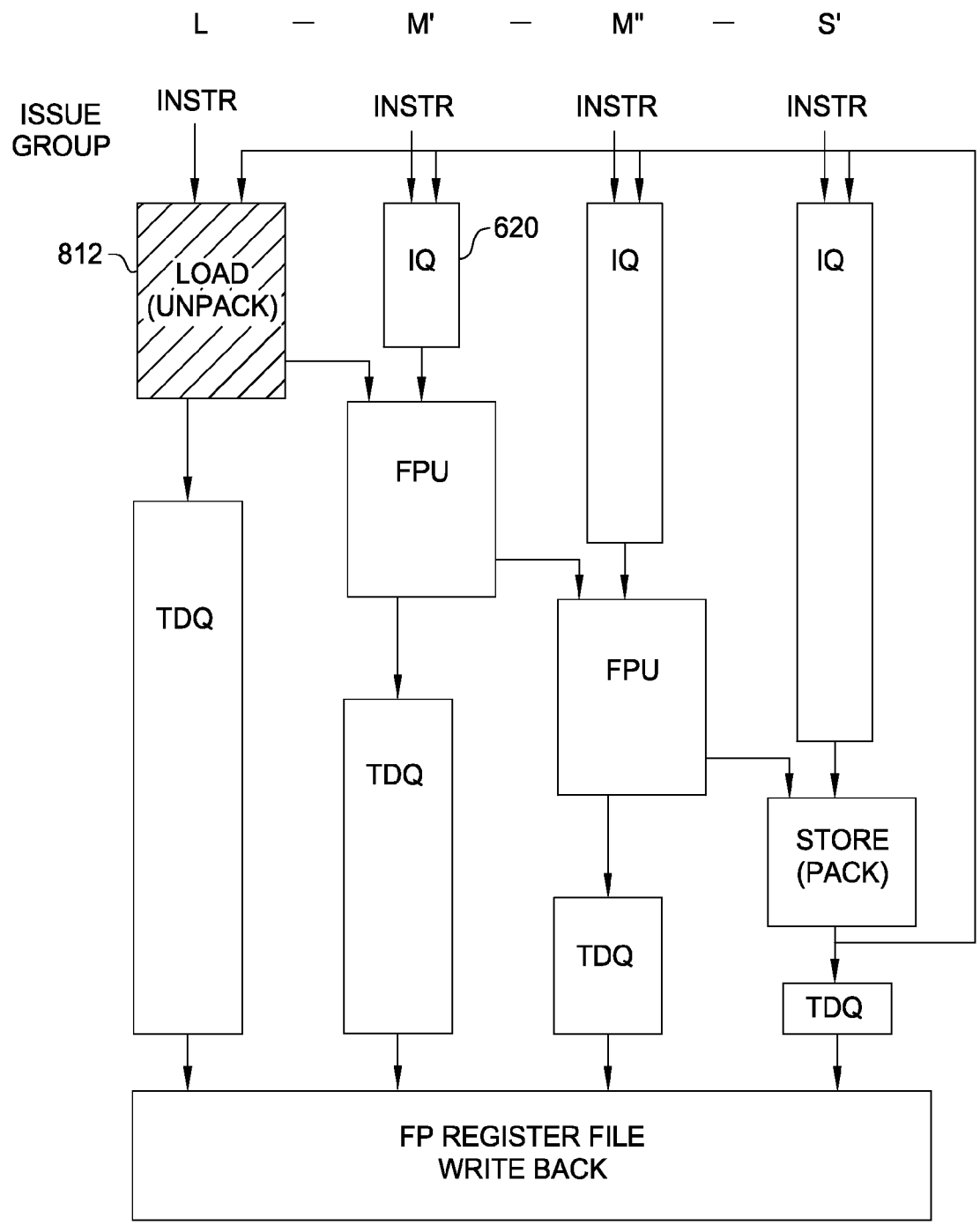
FIGS. 9A-9D illustrate the flow of instructions through the pipeline unit shown in FIG. 5.
Figure 9B:
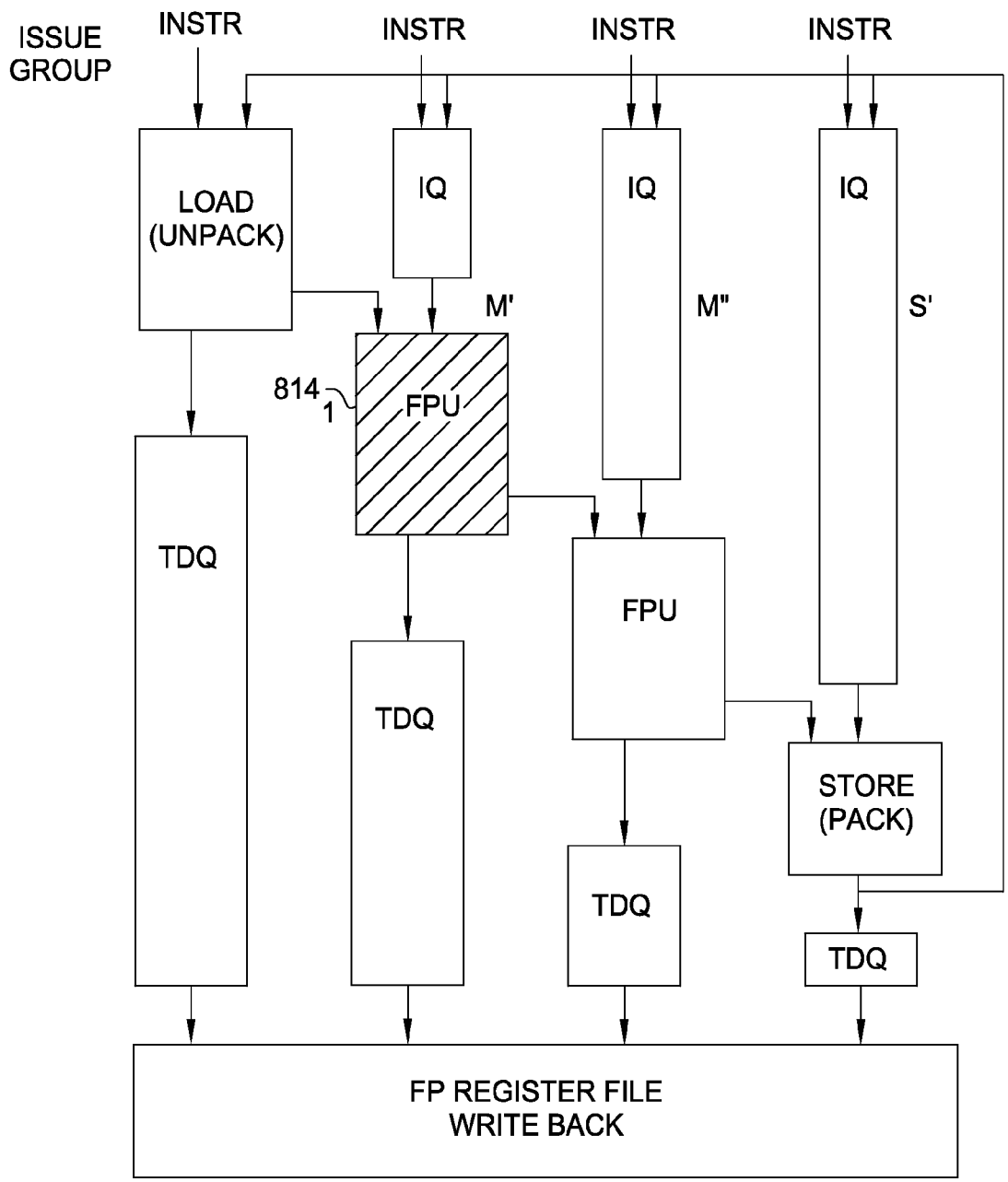
Figure 9C:
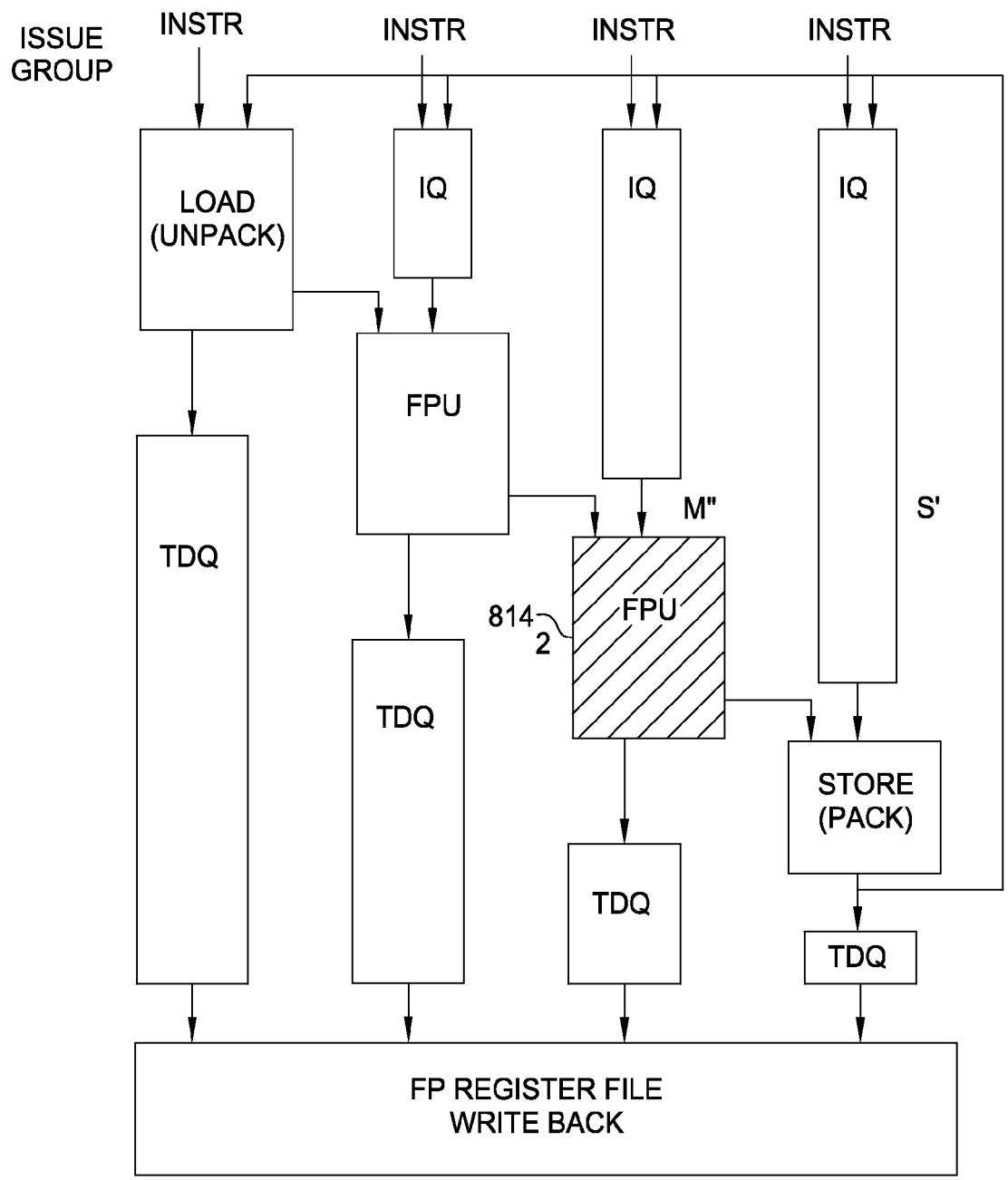
Figure 9D:
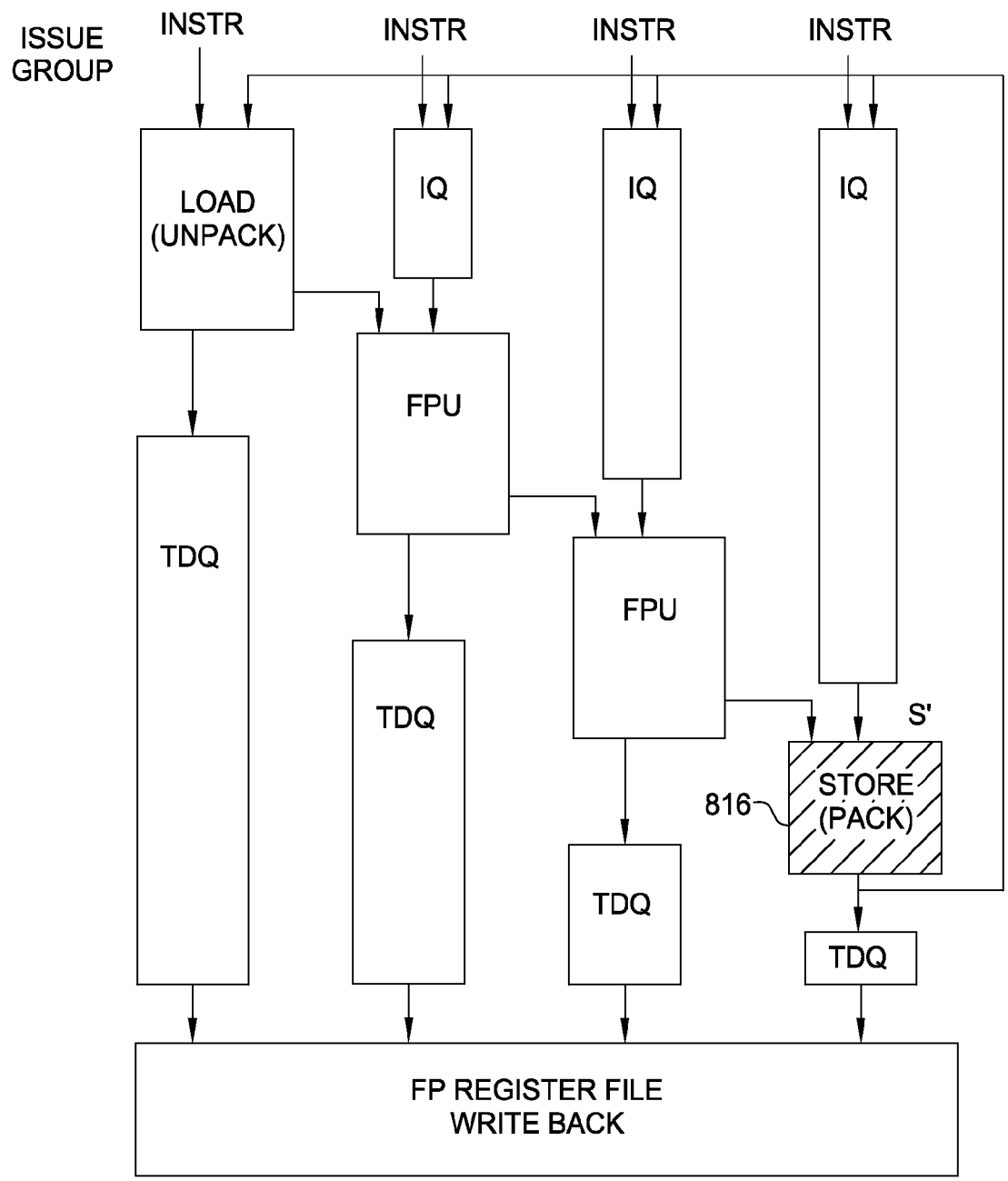

As illustrated in FIG. 9B, the results of executing the first load (L') may be forwarded to the first FPU $814_1$ as the first MADD instruction (M') arrives. As illustrated in FIG. 9C, the results of executing the first MADD (M') may be available just as the second MADD (M") reaches the second FPU $814_2$ of the third pipeline (P2). Finally, as illustrated in FIG. 9D, the results of executing the second MADD (M") may be available as the store instruction (S') reaches the second LSU 812 of the fourth pipeline (P3).

Results of executing instructions in the first group may be used as operands in executing the subsequent issue groups and may, therefore, be fed back (e.g., directly or via TDQs 630), or forwarded to register file write back circuitry. For some embodiments, the (floating point) results of the second MADD instruction may be further processed prior to storage in memory, for example, to compact or compress the results for more efficient storage.

When comparing the floating point cascaded, delayed, execution pipeline unit 800 shown in FIG. 8 with the integer cascaded, delayed, execution pipeline unit 600 shown in FIG. 6, a number of similarities and differences may be observed. For example, each may utilize a number of instruction queues 620 to delay execution of certain instructions issued to "delayed" pipelines, as well as target delay queues 630 to hold "intermediate" target results.

The depth of the FPUs 814 of unit 800 may be significantly greater than the ALUs 600 of unit 800, thereby increasing overall pipeline depth of the unit 800. For some embodiments, this increase in depth may allow some latency, for example, when accessing the L2 cache, to be hidden. As an example, for some embodiments, an L2 access may be initiated early on in pipeline P2 to retrieve one of the operands for the second MADD instruction. The other operand generated by the first MADD instruction may become available just as the L2 access is complete, thus effectively hiding the L2 access latency.

In addition, the forwarding interconnects may be substantially different, in part due to the fact that a load instruction can produce a result that is usable (by another instruction) as an address, a floating point MADD instruction produces a floating point result, which can not be used as an address. Because the FPUs do not produce results that can be used as an address, the pipeline interconnect scheme shown in FIG. 8 may be substantially simpler.

Figure 10:
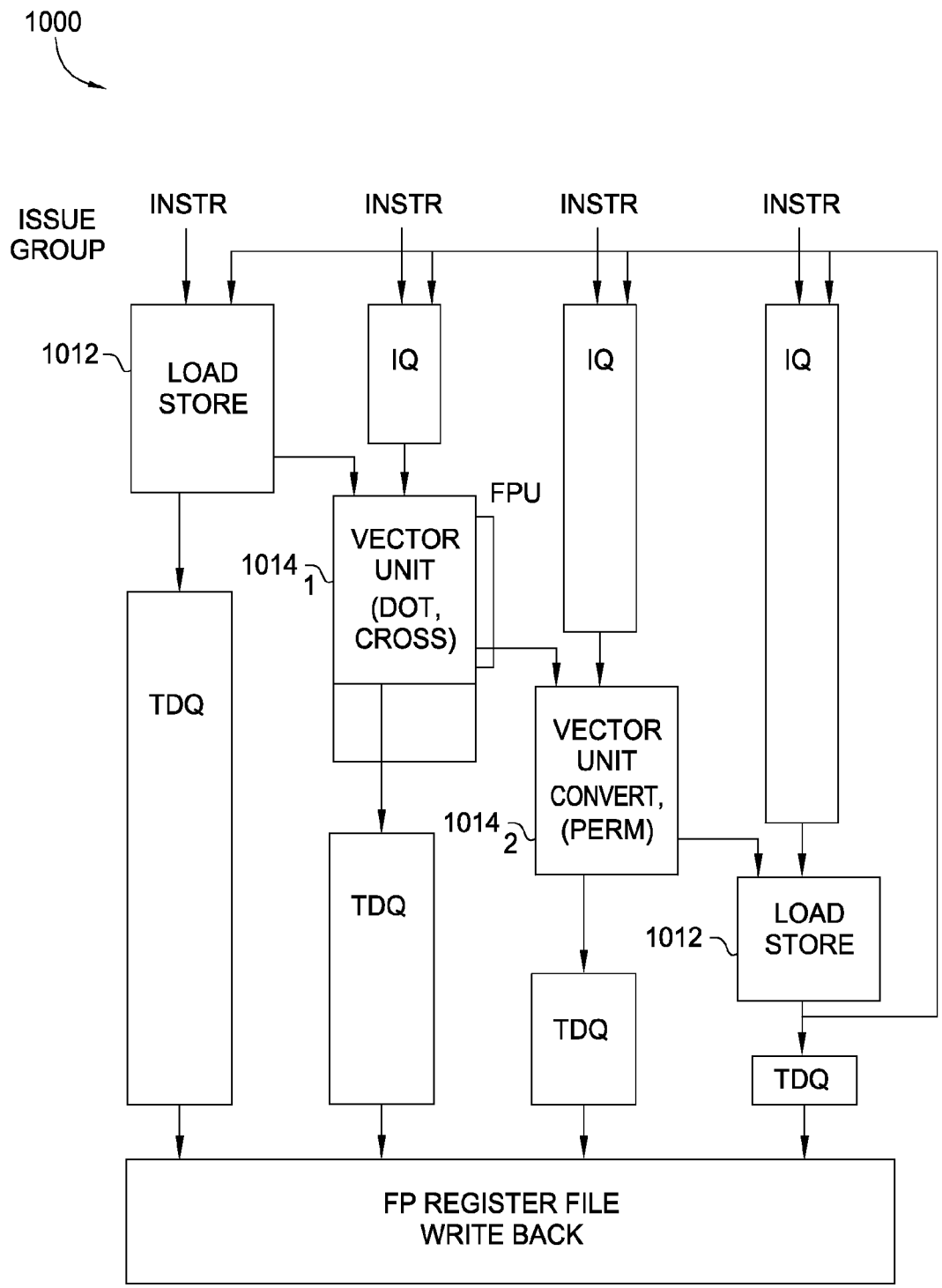
FIG. 10 illustrates an exemplary vector cascaded delayed execution pipeline unit in accordance with embodiments of the present invention.

For some embodiments, various other arrangements of pipeline units may be created for targeted purposes, such as vector processing with permutation instructions (e.g., where intermediate results are used as input to subsequent instructions). FIG. 10 illustrates a cascaded, delayed, execution pipeline unit 1000 that would accommodate such vector operations.

Similar to the execution unit 800 shown in FIG. 8, the execution unit 1000 has four execution units, including first and second load store units (LSUs) 1012, but with two vector processing units FPUs $1014_1$ and $1014_2$. The vector processing units may be configured to perform various vector processing operations and, in some cases, similar operations to the FPUs 814 in FIG. 8, as well as additional functions.

Examples of such vector operations may involve multiple (e.g., 32-bit or higher) multiply/adds, with the results summed, such as in a dot product or cross product. In some cases, once a dot product is generated, another dot product may be generated therefrom, and/or the result may be compacted in preparation for storage to memory. For some embodiments, a generated dot product may be converted from float to fix, scaled, and compressed, before it is stored to memory or sent elsewhere for additional processing. Such processing may be performed, for example, within a vector processing unit 1014, or in a LSU 1012.

Polymorphism

For some embodiments, polymorphism may be utilized to provide flexibility and allow a limited set of processing cores to accommodate a greater range of applications with varying characteristics. As used herein, the term polymorphism generally refers to transforming one or more physical processing cores so they appear differently for different applications. The performance and behavior of the processing cores may change, without altering the code being executed.

In the present context, polymorphism may be applied to execution units with cascaded arrangements of pipelines, such as those described above, to effectively present different pipelined execution units for different applications. As an example, two relatively narrow issue execution units may be combined to appear as a single execution unit with twice the issue width. Certain types of applications (e.g., applications with fewer threads) may benefit from fewer execution units with wider issue groups, while other applications (e.g., applications with a higher number of threads) may benefit from more execution units with narrower issue groups.

A variety of different techniques may be utilized to control whether one or more execution units are transformed ("morphed") to appear differently. These techniques may include control via software (e.g., via an application or operating system) to set a bit to control various logic components (e.g., predecoding, issue/dispatch, and path selection in different), via decoding/pre-decoding of instruction streams, dynamically in hardware (e.g., setting some types of flags to change an issue width based on monitored execution), or a combination thereof.

Instruction Level Parallelism (ILP) Morph

One example of a morph may be referred to as an Instruction Level Parallelism (ILP) Morph. The general idea is to achieve increased parallelism by combining relatively narrow execution units to achieve increased issue width for the same instruction stream. By controlling the transformation, two execution units may be combined to provide increased issue width for certain applications (e.g., gaming applications with relatively few threads) or kept separate to accommodate more threads (e.g., for a server with a high number of tasks).

Figure 11:
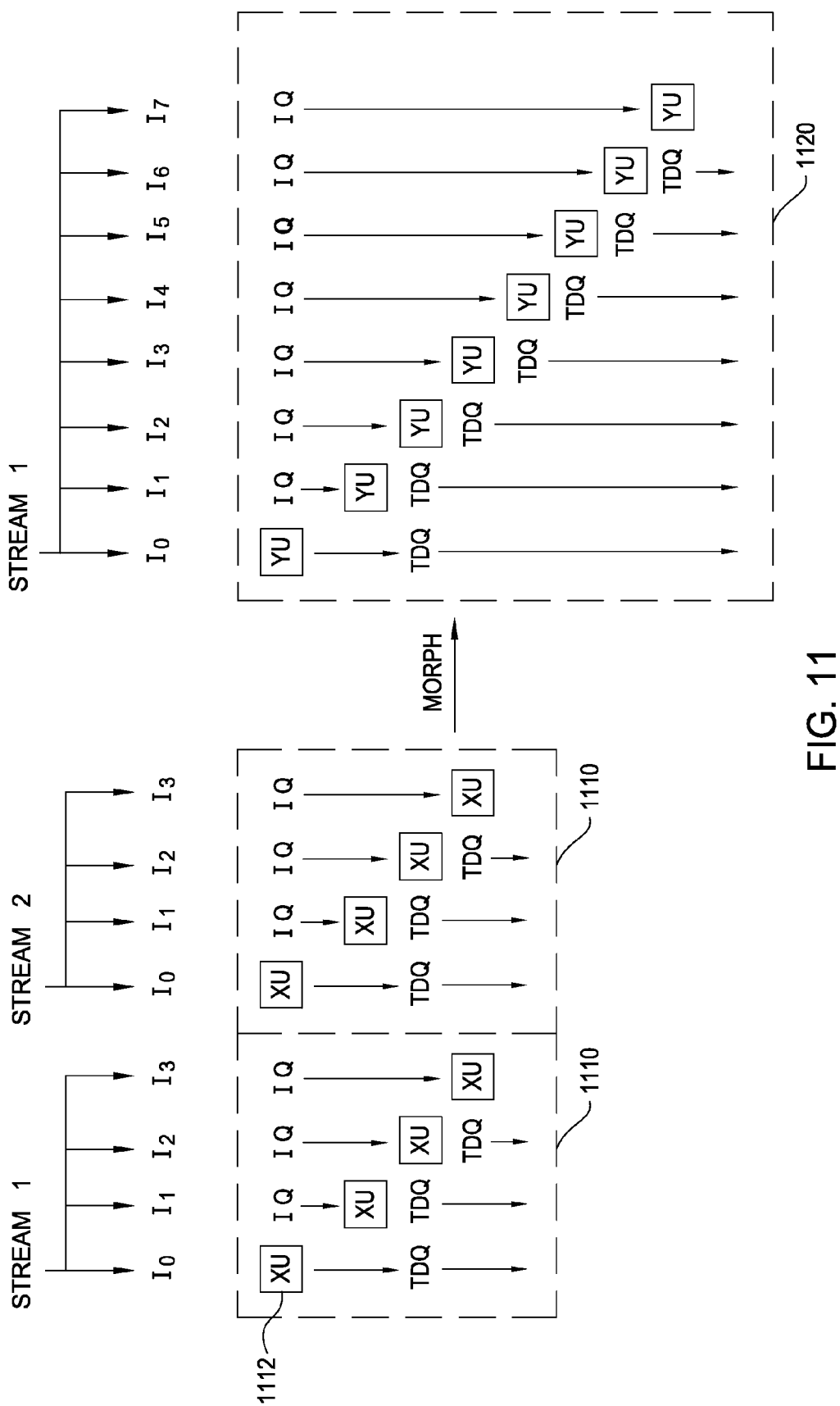
FIG. 11 illustrates an example of morphing physical cores of a processor to appear differently to different applications.

FIG. 11 illustrates an example of an ILP morph to make physical cores of a processor to appear differently to different applications. As illustrated, in a base mode, two relatively narrow processing cores 1110 may function separately. In the illustrated example, each core 1110 has four pipelines and is capable of processing four instruction issue groups from separate instruction streams.

The processing cores 1110 may be morphed, however, to appear as a single processing core 1120 in a ganged mode. As illustrated, the morphed processing core 1120 effectively functions as a cascaded arrangement of pipelines that is twice as wide and twice as deep as the separate cores 1110. As a result, the processing core 1120 is capable of processing eight instructions from a single instruction stream which, for some applications, may greatly increase performance.

To effectively increase the depth of the core 1120 in order to accommodate the additional pipelines, some mechanism must be made to increase the depth of instruction queues (IQs) for pipelines with processing units that are more delayed relative to the separate cores 1110 and to increase the depth of target delay queues (TDQs) for pipelines with processing units that are more delayed relative to the separate cores 1110.

Figure 12A:
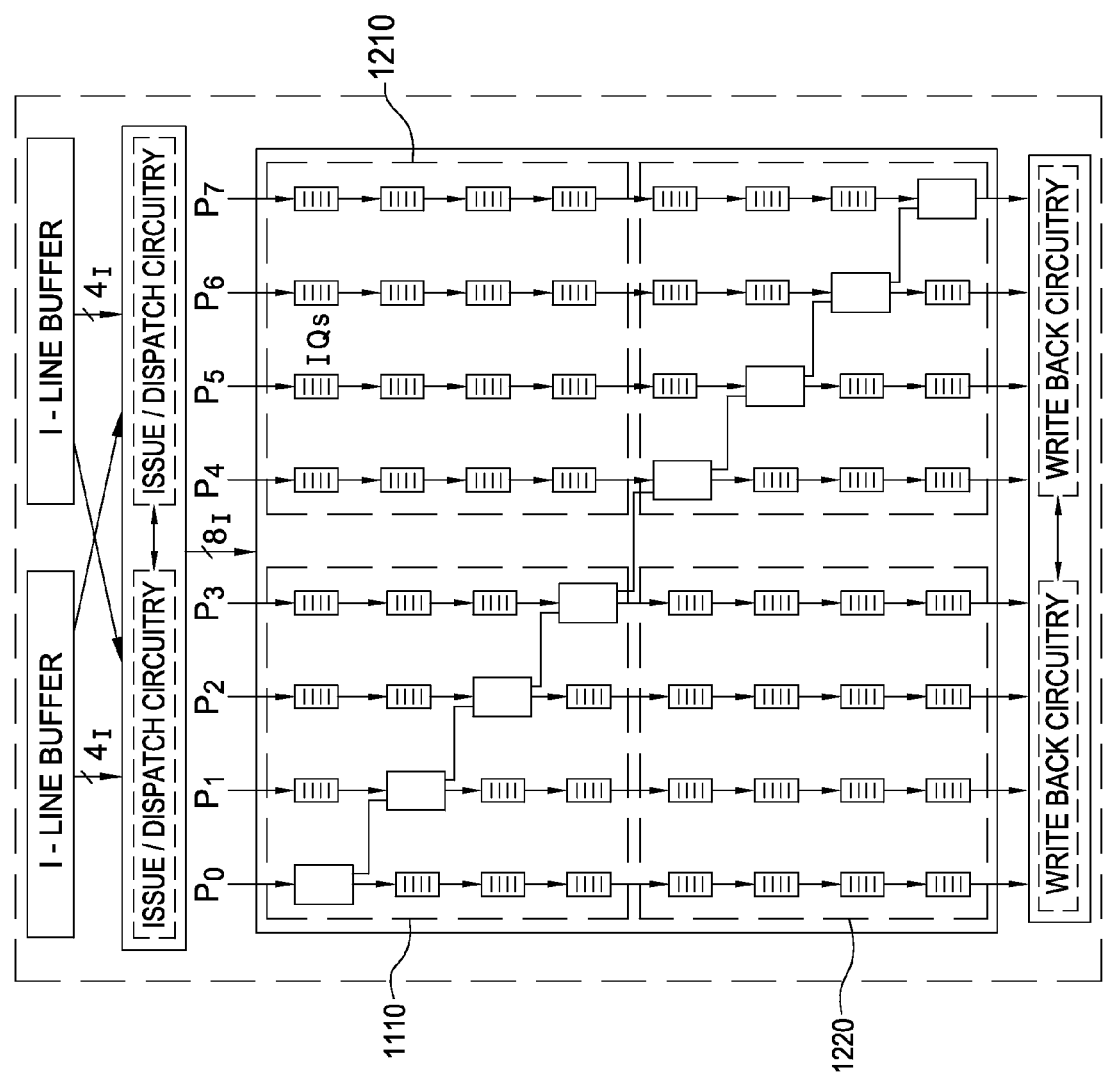
FIGS. 12A and 12B illustrate exemplary cascaded delayed execution pipeline units morphed to appear as a single unit in accordance with embodiments of the present invention.

As illustrated in FIG. 12A, one approach to increasing the depth of IQs and TDQs for the morphed core 1120 is to add additional hardware. As illustrated, the morphed core 1120 may utilize additional IQs 1210 to buffer instructions and additional TDQs 1220 to buffer results. Multiple paths and control logic may be provided to effectively bypass this additional logic in the base mode, when the cores are acting separately.

Figure 12B:
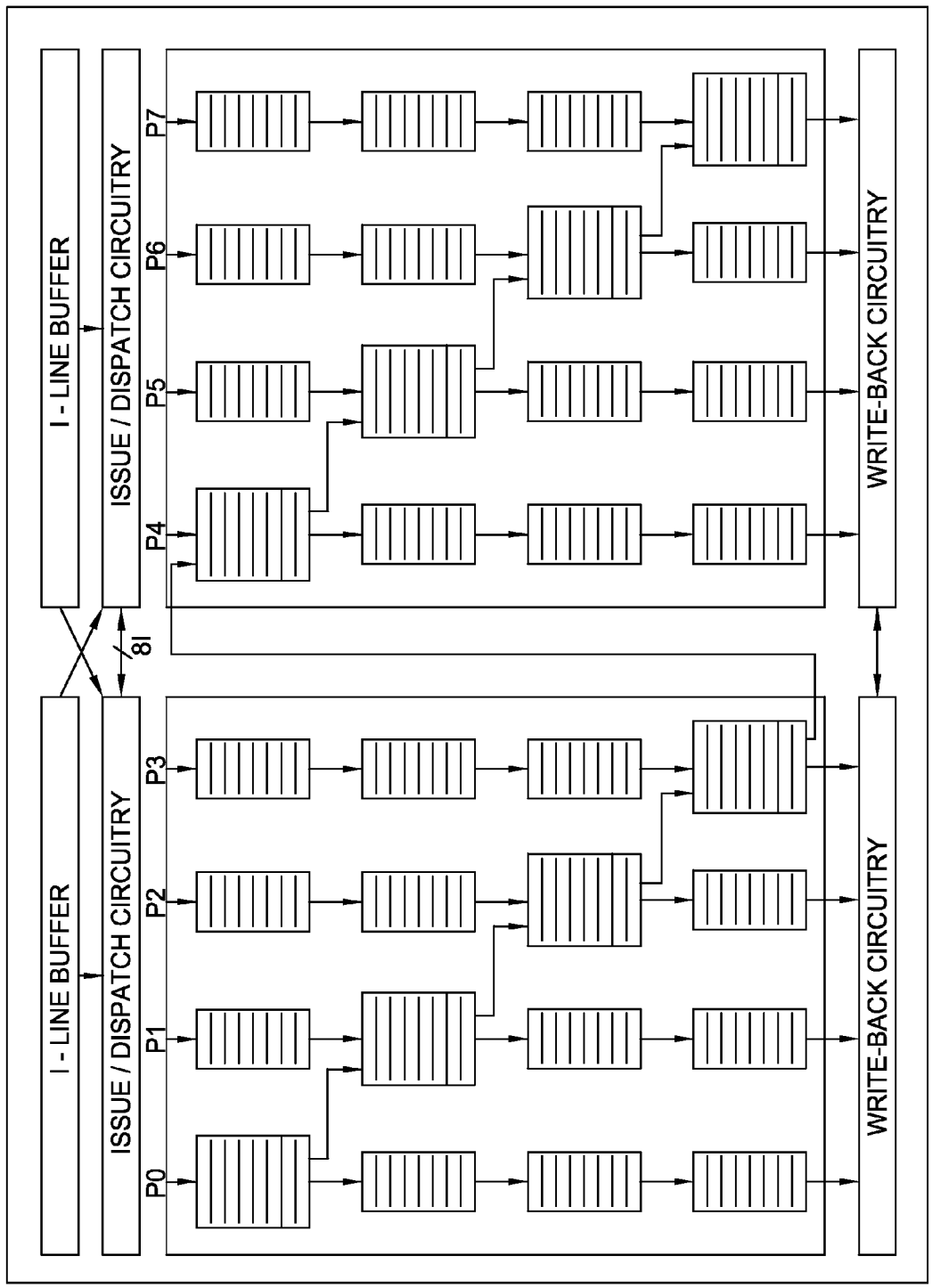

As illustrated in FIG. 12B, an alternative approach to actually increasing the depth of IQs and TDQs for the morphed core 1120 with additional hardware is to accommodate the additional depth with control logic. As an example, pre-decoding and/or issue/dispatch circuitry may be configured to control the timing of issue groups such that all instructions of an issue group effectively propagate down the pipeline together. In other words, in the illustrated example, the first four instructions (10-13) in an eight-wide group may be issued to the left half core on one cycle, while the second four instructions (14-17) are issued four cycles later. Write back circuitry may be similarly controlled to effectively hold results from the earlier (left half) processing units so that write backs are properly synchronized.

As demonstrated above, various logic components may work together to enable the morphing of processor cores. For example, predecoding circuitry may be configured flexibly so it can be told whether it is scheduling for a single four issue core or a ganged eight issue core and set scheduling flags accordingly. As such, the instructions may be properly aligned in the I-line buffers. Depending on the embodiments, resources for multiple cores may be ganged together.

Figure 13:
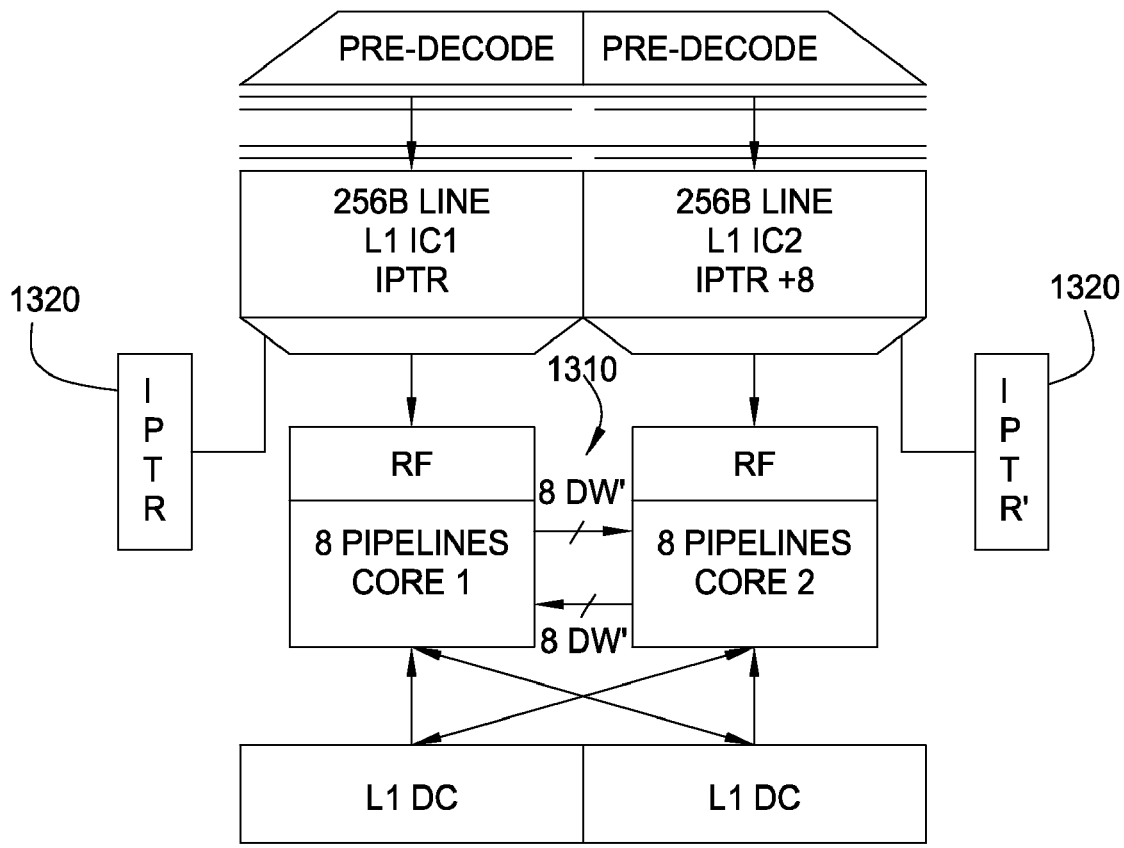
FIG. 13 illustrates another example of morphing physical cores of a processor to appear differently to different applications.

For example, as illustrated in FIG. 13, pre-decoding circuitry may be effectively ganged together to generate wider issue groups for the ganged cores. For some embodiments, instruction streams may be pre-decoded such that instructions are properly aligned in the Instruction caches that feed each core. As described above, in some cases (if additional instruction queues are not implemented) this alignment may involve offsetting instructions in a same issue group in the I-cache of one processing core relative to the other. This offsetting may be accomplished, for example, by controlling the instruction pointer of one I-cache to be offset by the issue width of the individual cores (e.g., +4 or +8).

For some embodiments, a single pre-decoder may be configured to schedule for a single or ganged issue width. For example, a control bit (set in software or otherwise) may indicate to the pre-decoder what issue width it is scheduling for and the pre-decoder may act accordingly, for example implementing the appropriate bits to control logic during execution. While this may add some complexity, once the scheduling is accomplished for the wider issue group, scheduling logic for the narrow issue group is basically a subset of the same logic.

In any case, instruction streams from the pre-decoder(s) may flow into one or more of the I-caches for execution by the ganged core. Depending on the embodiment, a single I-cache may feed multiple ganged cores or the instructions may be divided among I-caches of the ganged cores. Further, as will be described in greater detail below, for some embodiments, one type of morph may allow a single instruction to control processing units of multiple cores. In such a case, the instruction may be replicated in each I-cache or part of the instruction contained in each.

In order to gang the processing cores, provisions may be made so that each core can receive data from the other core and update the other core's file registers and/or write to the other core's data cache. Thus, as illustrated in FIG. 13, additional data paths (wires) may be implemented to allow these updates. Logic may implemented so that, in a normal operating or base (non-ganged) mode, these paths are simply not be used. In order to operate optimally, these paths may be designed to allow a core to update registers in the other core as rapidly as updates within the same core.

Figure 14:
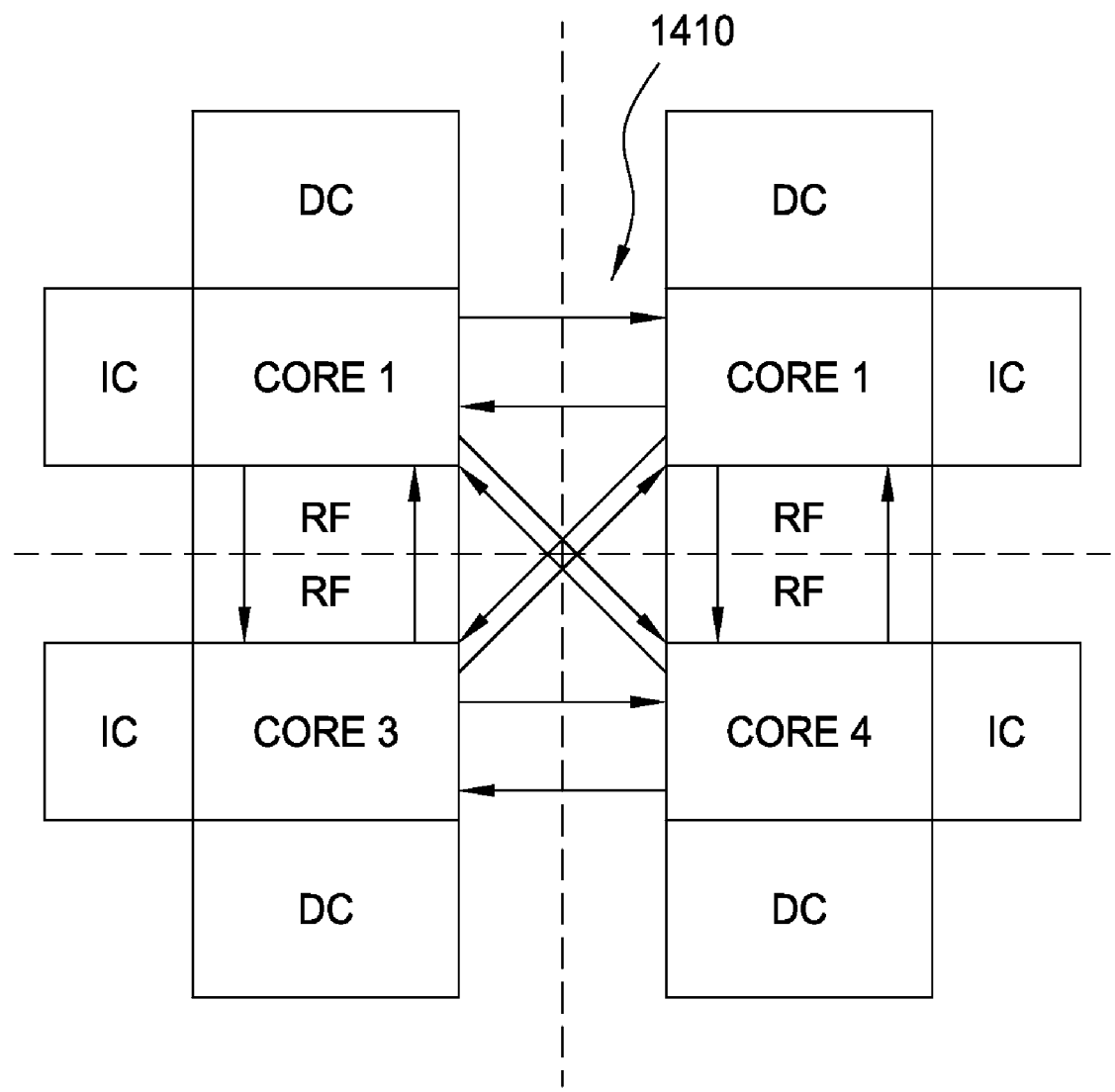
FIG. 14 illustrates another example of morphing physical cores of a processor to appear differently to different applications.

As illustrated in FIG. 14, the morphing idea may be extended beyond just two cores. In the illustrated example, four cores are morphed together to form a single core that has four times the issue width. As illustrated, each core may be able to update register files in one or more of the other cores. However, placing practical constraints on this updating (e.g., limiting hot forwards to within a certain instruction width) may reduce the number of inter-core wiring and facilitate layout.

Physical Floorplan

In order to accomplish updates between processing cores at desired frequencies careful planning may go into the physical layout ("floorplan") of the processing cores and their components to limit the transmission paths for high frequency updates.

One approach that may be used to accomplish a physical layout that will satisfy the timing requirements of a morphed execution unit is to basically design a processing core to satisfy the timing requirements for the wider widths of the morphed (ganged) cores. If the timing requirements for the wider issue cases can be met, than logic may be implemented to effectively split the wider issue cores into the separate narrower issue cores. In accordance with this approach, by effectively designing wider issue cores to be divided in half, a physical layout may have components that are a mirror image across an axis.

Figure 15:
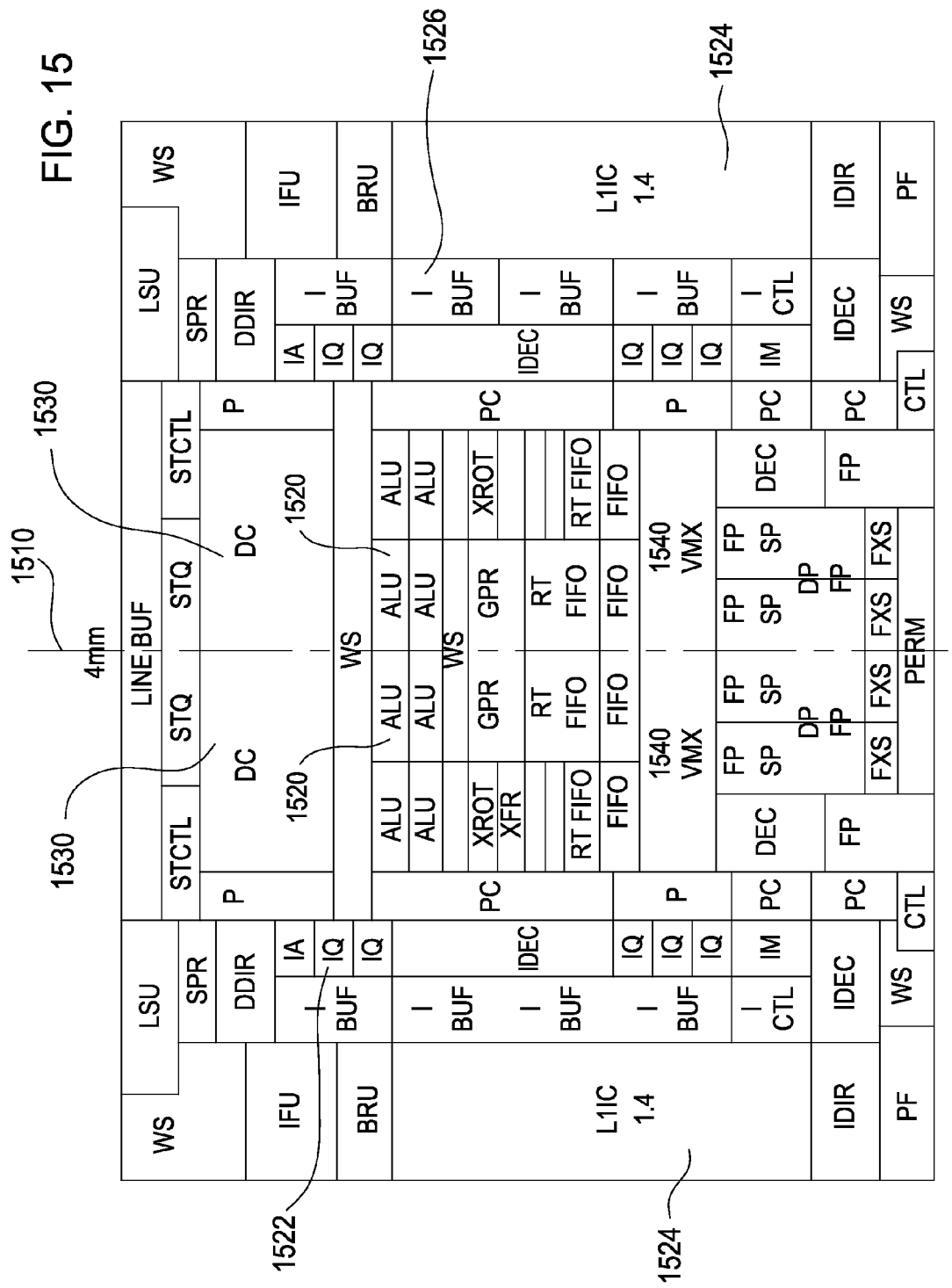
FIG. 15 illustrates an example physical layout ("floorplan") in accordance with one embodiment of the present invention.

FIG. 15 illustrates on example of such a "butterfly" floorplan that is substantially symmetrical about an axis 1510. The layout may be designed to minimize the latency between load units and the data cache, as well as latency between the processing units (ALUs in this example) themselves. For embodiments with floating point units, the timing requirements may be somewhat more relaxed, as an extra cycle or two is often allowed to get load results to a floating point unit.

The illustrated example floorpan attempts to minimize paths between cache fetch and ALUs by putting a cluster of ALUs 1520 close to where the fetch data is coming out (the Data Cache 1530). By limiting hot forwards in the cascaded pipelines, there is very little routing of high speed signals that has to be done across the border between the separate cores, only between load-add boundaries. Further, by removing the TLBs from the processing cores, as described above, frequency issues related to address translation are removed.

As illustrated, other components, such as the instruction queues 1522, I-caches 1524, and instruction buffers 1526 may also be mirrored across the axis 1510. In a base mode, the two instruction cache halves 1524 are operated independently and are able to supply complete instructions to their respective cores. However, in unified or ganged mode, one instruction cache can supply half of the instructions, while the other instruction cache can supply the other half. In other words, decoding logic may load the I-caches in two different ways depending on the morph mode: one where each I-cache supplies half of the instructions of an issue group and another where each I-cache supplies whole issue groups instruction.

One advantage to utilizing both I-caches even if a single I-cache could supply all instructions to the ganged core is that, by having each I-cache supply half, one I-cache does not have to drive instructions the entire distance to the other side. For some embodiments, however, power savings may be realized by shutting down logic components that are not used for a core that is ganged together. For example, if a single I-cache or D-cache were used for the ganged core, the unused caches could be powered down.

In the illustrated example, a (VMX) unit is illustrated. Depending on the particular embodiment, the VMX unit could be kept as a single unit or could also be divided, for example, about the axis 1510.

Figure 16:
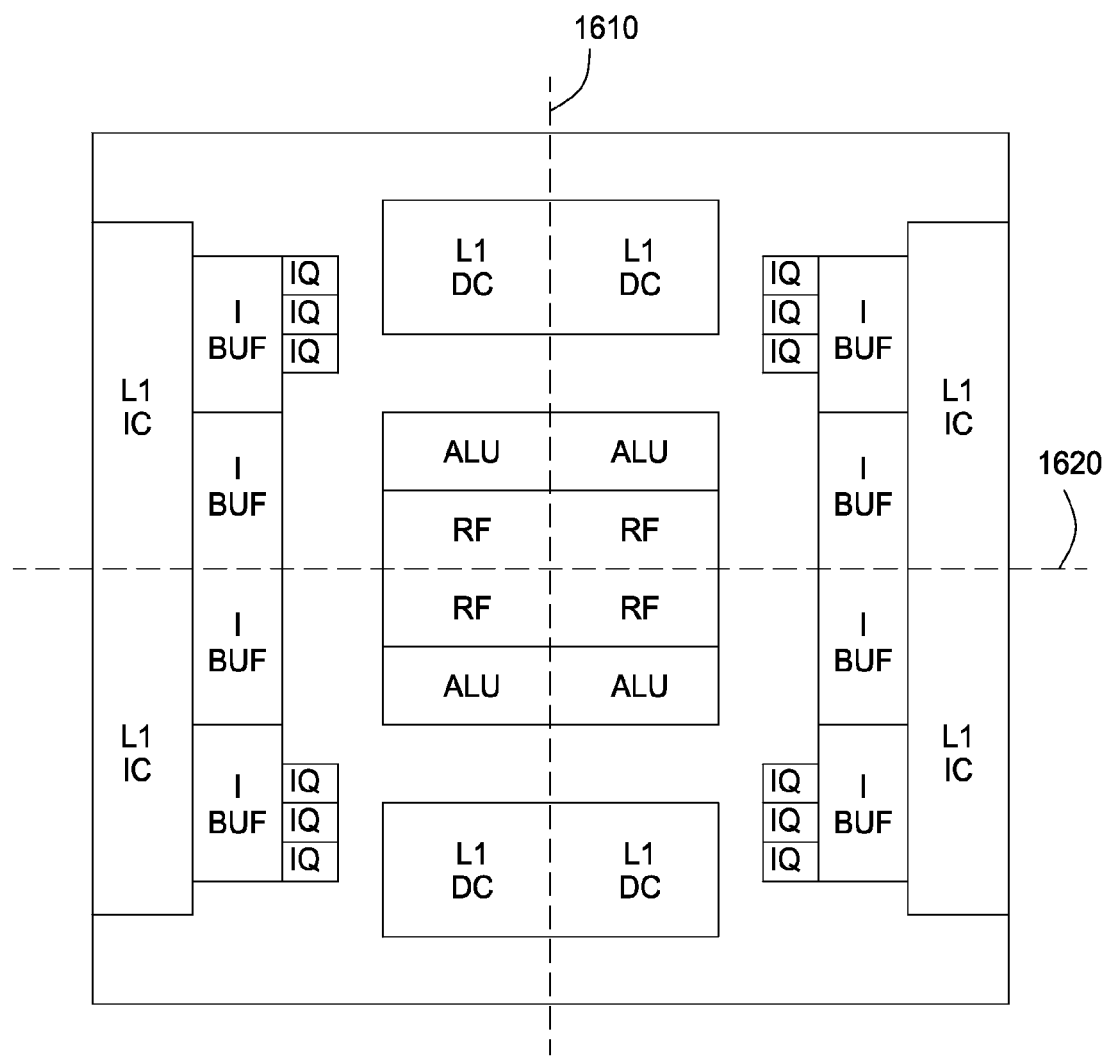
FIG. 16 illustrates another example floorplan in accordance with one embodiment of the present invention.

Of course similar concepts may be applied for a floorplan that allows more than two cores to be morphed into one. For example, FIG. 16 illustrates a floorplan that combines four cores. As illustrated, in such a four-core application, components may be laid out in a manner that results in substantially mirror images about both a horizontal axis 1610 and a vertical axis 1620. Similar techniques as those described above may be utilized to distribute instruction load among different I-caches or allow a single I-cache to supply an entire instruction stream to multiple cores.

Vector Morphing

Another example of a morph may be referred to as a Vector Morph. The general idea is to achieve increased parallelism by combining relatively narrow execution units to achieve increased issue width for the same instruction stream. By controlling the transformation, two or more execution units may be combined to provide increased issue width for certain applications (e.g., gaming applications with relatively few threads) or kept separate to accommodate more threads (e.g., for a server with a high number of tasks).

FIG. 17 illustrates an example of a vector morph to make physical cores of a processor to appear differently to different applications. As illustrated, in a base mode, two relatively narrow processing cores 1710 may function separately. In the illustrated example, each core 1710 has four pipelines and is capable of processing four instruction issue groups from separate instruction streams.

The processing cores 1710 may be morphed, however, to appear as a single processing core 1720 in a ganged mode. In some embodiments, the instruction queues and target delay queues may be shunted, effectively providing a parallel arrangement of pipelines that is larger than the separate cores 1710, as illustrated in FIG. 17. As a result, larger instructions (e.g., 64 bit vector instructions), with several operations, such as the instruction illustrated in FIG. 18, may be processed in parallel with a single instruction. Operations found within an instruction may include vector load (VL), vector multiply/add (VMADD), vector store (VST), branch conditional target (BCT), and other instructions known by those skilled in the art.

In some embodiments, the processing cores 1710 may be morphed, however, to effectively function as a cascaded arrangement of pipelines that is wider and deeper than the separate cores 1710. As a result, the processing core 1720 is capable of processing eight or more instructions from a single instruction stream which, for some applications, may greatly increase performance.

To effectively increase the depth of the core 1720 in order to accommodate the additional pipelines, some mechanism must be made to increase the depth of instruction queues (IQs) for pipelines with processing units that are more delayed relative to the separate cores 1710 and to increase the depth of target delay queues (TDQs) for pipelines with processing units that are more delayed relative to the separate cores 1710.

Figure 19:
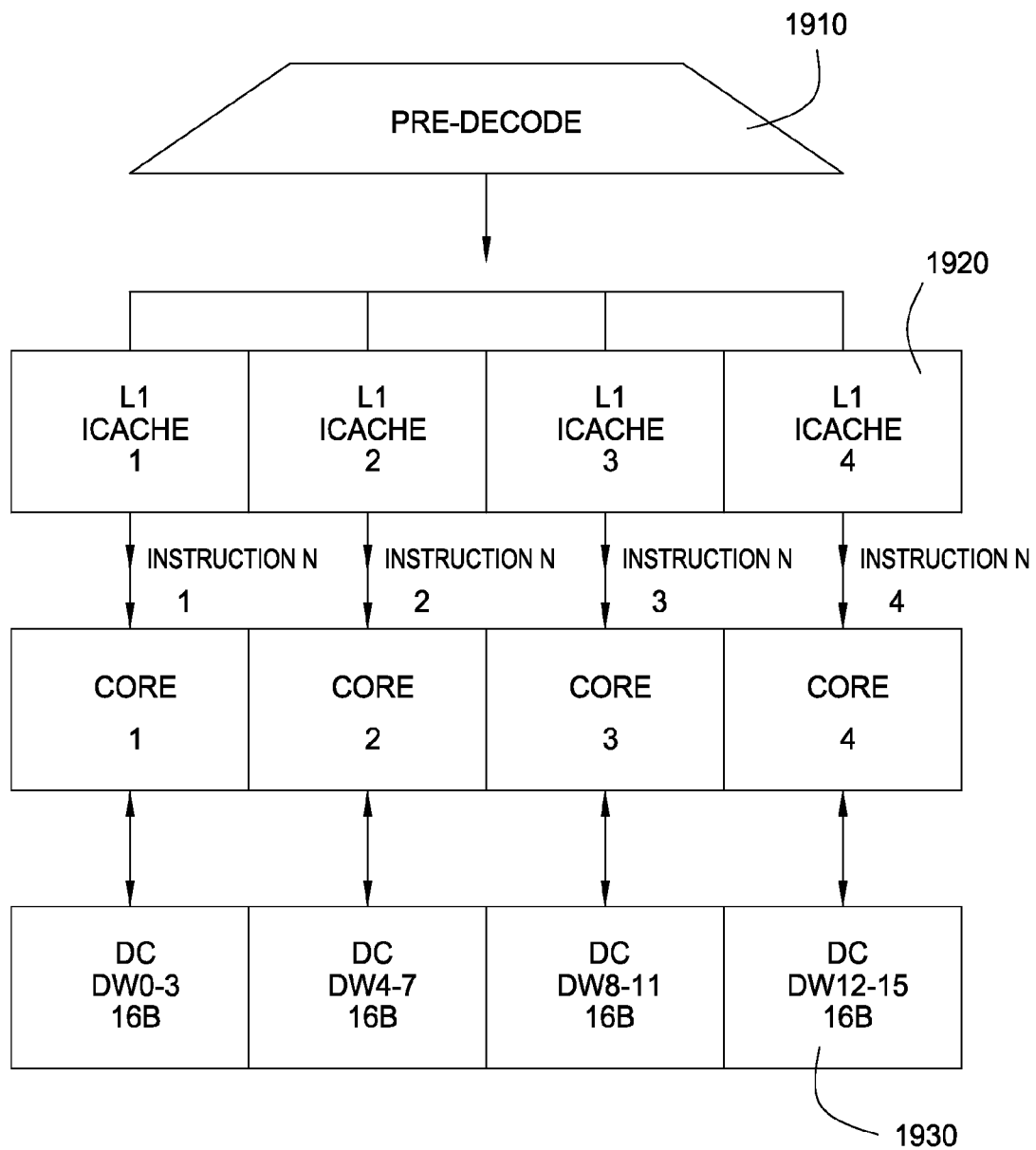
FIG. 19 illustrates a multi-chip package (MCP) in accordance with one embodiment of the present invention.

In addition to morphing two processing cores, as described above, a plurality of processing cores may be morphed together. For example, a chip may have four processing cores, each processing core having four pipelines. In some embodiments, all four pipelines of all four processing cores may be morphed to work together. FIG. 19 illustrates four processing cores morphed together, according to embodiments of the present invention.

One way in which all four processing cores may be morphed together is to load the same instruction line in each I-Cache 1920 resulting in all four cores seeing the same instruction every cycle. With reference to the previous example, the result is the performance of 16 instances of the same operation (e.g., LMADD), in parallel. This is enabled by having 16 elements in a cache at one time and each core being assigned a subset of 4 elements to grab (e.g., CORE0 grabs elements 0-3, CORE1 grams elements 4-7, etc.) by receiving an extra displacement (e.g., +0, +4, +8, +12). Each processing core is assigned a subset of 4 elements to grab by control logic 1930. In some embodiments the control logic may be coupled with the pre-decode logic 1910.

One concern in loading the same instruction line in each I-Cache 1920, as described above, is the unnecessary power that may be consumed in powering the I-Cache 1920, decoders and other hardware for each of the four cores. Several of these hardware components may not be necessary for operations because the instruction of one core is the same as the instruction for each of the other cores. For example, in a vector mode configuration there is one instruction that will do 16 multiply/adds or 16 loads or 16 stores, and each I-Cache will have a copy of the same instruction.

Another way in which all four processing cores may be morphed together, while overcoming the power concerns described above, is to designate one processing core as a master and load the instruction line in the corresponding I-Cache 1920 and power down the I-Cache 1920, decoders, and other un-used hardware for the remaining 3 processing cores. For example, if a single I-cache or D-cache were used for the ganged core, the unused caches could be powered down. A bus may then be run from the I-Cache 1920 of the master processing core to all of the remaining processing cores.

Figure 20:
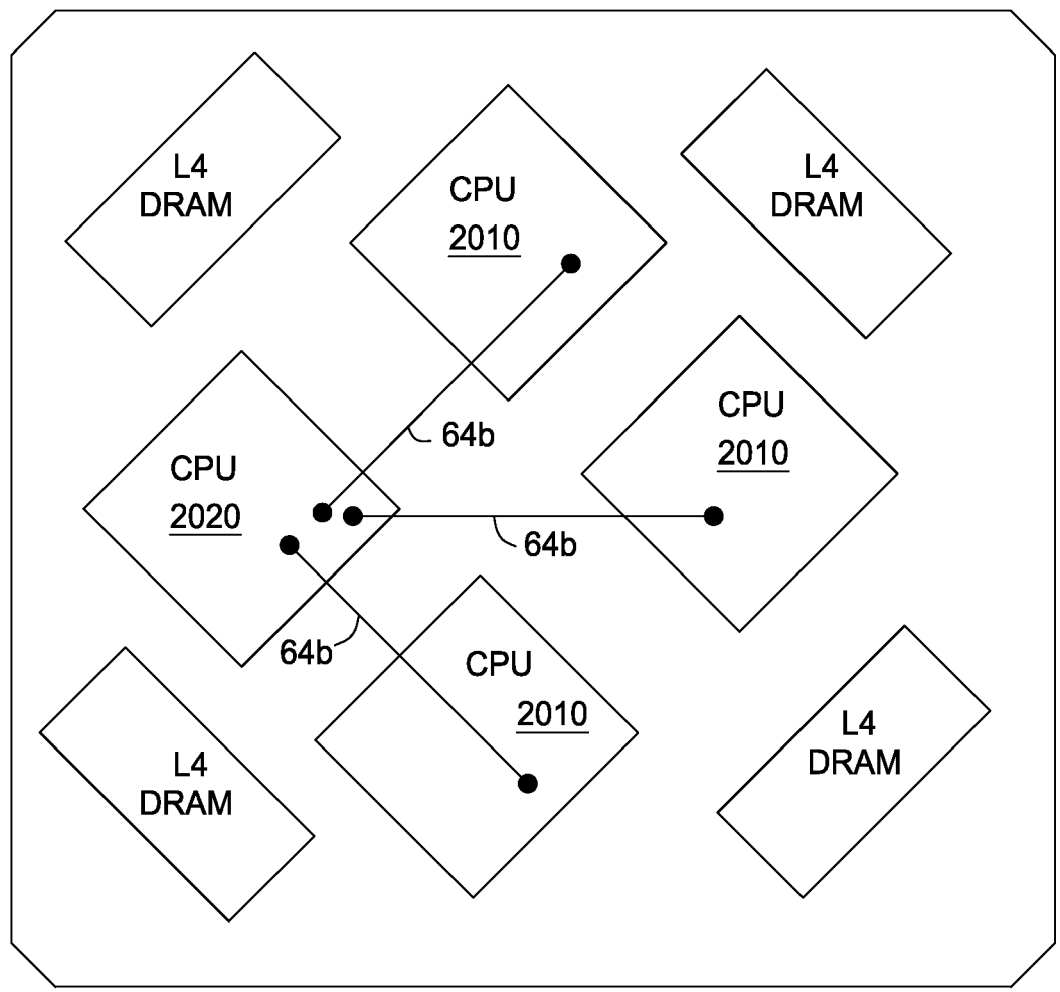
FIG. 20 illustrates multiple CPUs being morphed together.

In some embodiments, multiple CPUs may be morphed together to appear like a single processing core. FIG. 20 illustrates multiple CPUs 2010 being morphed together. In some embodiments, the multiple CPUs 2010 may reside on separate chips. A first CPU 2020 is designated as a master and issues instructions via a plurality of 64 bit buses to the remaining CPUs 2010. Logic may be implemented to ensure proper timing and instruction division is maintained between the various CPUs.

Figure 21:
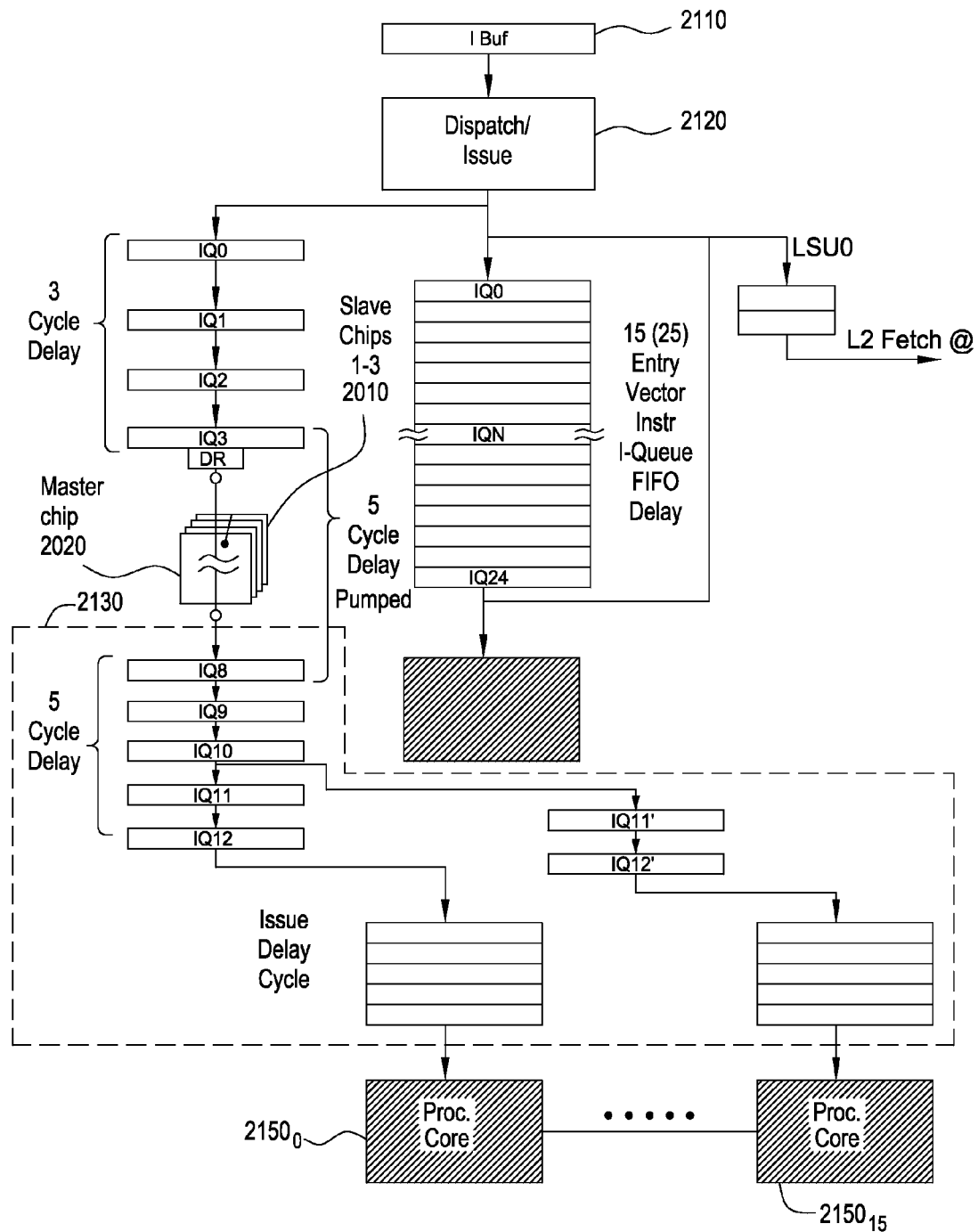
FIG. 21 illustrates the logic that may be employed in maintaining proper timing between the various CPUs.

FIG. 21 further illustrates the logic that may be employed in maintaining proper timing between the various CPUs. A common I-Buffer 2110 may be used to retrieve and store the instructions before they are dispatched and issued by Issue/Dispatch Logic 2120. The I-Buffer 2110 and Issue/Dispatch Logic 2120 may be physically located on the master chip 2020. The issued instruction is then sent to an instruction queue before being sent to the master CPU 2020 and slave CPUs 2010. The instruction then passes through delay logic 2130 on each CPU to ensure proper instruction synchronization before being executed by each of the processing cores 2150 on each of the chips While the foregoing is directed to embodiments of the present invention, other and further embodiments of the invention may be devised without departing from the basic scope thereof, and the scope thereof is determined by the claims that follow.

What is claimed is:

1. A processor, comprising:
   a first and second processor core, each comprising: (i) a plurality of pipelined execution units configured to respectively execute a first and second issue group of multiple instructions and (ii) at least one of an instruction queue for delaying instruction execution and a target delay queue for holding results from instruction execution; and scheduling logic configured to, when the processor is in a base mode of operation, issue the first issue group to the first processor core for execution and the second issue group to the second processor core for execution and, when the processor is in a ganged mode of operation, issue one or more vector instructions to a morphed processor core formed from the first and second processor cores wherein each issue group comprises instructions issued in a single cycle;

wherein each of the first and second processor cores is configured to, when the processor is in the base mode of operation, cascade execution of its respective issue group, using at least one of the instruction queue and the target delay queue;

wherein the morphed processor core is configured to, when the processor is in the ganged mode of operation, cascade execution of the one or more vector instructions by increasing a queue depth of at least one of the instruction queue and the target delay queue of at least one of the first processor core and the second processor core.

2. The processor of claim 1, wherein the first and second processor cores each have N pipelined execution units capable of executing an issue group of N instructions.

3. The processor of claim 1, wherein cascading execution comprises commencing execution of instructions in a common issue group in a delayed manner with respect to each other.

4. The processor of claim 3, wherein the pipelined execution units of the first and second processor core execute operations corresponding to vector instructions in a parallel manner when the processor is in the ganged mode of operation.

5. The processor of claim 1, further comprising a mechanism controllable by a software instruction to select between the base and ganged operating modes.

6. The processor of claim 1, wherein the scheduling logic is configured to:

send identical copies of the vector instruction to the first and second processor core, resulting in the first and second processor core seeing the same instruction during a single clock cycle; and send an offset value to the first and second processor core, effectively assigning a first subset of the vector instruction to the first processor core and assigning a second subset of the vector instruction to the second processor core.

7. The processor of claim 1, wherein at least one of the pipelined execution units of the second processor core is cascaded in the morphed processor core, relative to at least one of the pipelined execution units of the first processor core.

8. The processor of claim 1, wherein the morphed processor core has a cascade depth of up to a sum of the pipelined execution units of the first processor core and the pipelined execution units of the second processor core.

9. The processor of claim 1, wherein the first processor core has N pipeline execution units, wherein the second processor core has M pipeline execution units, wherein the one or more vector instructions comprise a third issue group including N vector operations and further including M vector operations, and wherein the processor is configured to execute, during the ganged mode of operation, at least one of: (i) the M vector operations, subsequent to executing the N vector operations; and (ii) the N vector operations, subsequent to executing the M vector operations.

10. The processor of claim 9, further comprising:

decoder logic configured to, during the ganged mode of operation, load the N vector operations to a first instruction cache associated with the first processor core and load the M vector operations to a second instruction cache associated with the second processor core.

11. The processor of claim 10, wherein the decoder logic is further configured to, during the base mode of operation, load N instructions to the first instruction cache, wherein the N instructions are selected from the first issue group of instructions, and wherein at least one vector operation is selected from a vector load, a vector add, a vector multiply, a vector store, and a branch condition target.

12. The processor of claim 11, wherein the first instruction cache and the second instruction cache are substantially symmetrical about a predefined axis, and wherein exactly one of the first instruction cache and the second instruction cache is configured to be selectively powered down during the ganged mode of operation, and wherein the decoder logic is further configured to, during the second mode of operation, load N+M vector operations to the one of the first instruction cache and the second instruction cache.

13. The processor of claim 12, wherein the morphed processor core is N+M wide and N+M deep, and wherein the scheduling logic is configured to issue, during the ganged mode of operation, at least one of:

M vector operations to the morphed processor core, N cycles subsequent to issuing N vector operations to the morphed processor core, wherein both the M and N vector operations are selected from the one or more vector instructions; and N vector operations to the morphed processor core, M cycles subsequent to issuing M vector operations to the morphed processor core, wherein both the N and M instructions are selected from the one or more vector instructions.

14. The processor of claim 13, wherein the morphed processor core is configured to, when the processor is in the ganged mode of operation, selectively perform one of:

cascading execution of the one or more vector instructions by increasing a queue depth of at least one of the instruction queue and the target delay queue of at least one of the first processor core and the second processor core; and parallelizing execution of the one or more vector instructions by shunting at least one of the instruction queue and the target delay queue of at least one of the first processor core and the second processor core.

15. The processor of claim 14, wherein each processor core comprises both the instruction queue and the target delay queue, wherein each processor core is configured to, when the processor is in the base mode of operation, cascade execution of its respective issue group, using both the instruction queue and the target delay queue, wherein execution of the one or more vector instructions is cascaded by increasing the queue depth of the instruction queue of a first one of the processor cores and increasing the queue depth of the target delay queue of a second one of the processor cores, and wherein execution of the one or more vector instructions is parallelized by shunting both the instruction queue and the target delay queue of the first and second processor cores.

16. A computing system, comprising:

a first and second processor, each comprising: (i) a plurality of processor cores for executing one or more vector instructions and (ii) at least one of an instruction queue for delaying instruction execution and a target delay queue for holding results from instruction execution; and scheduling logic configured to, when the computing system is in a base mode of operation, issue one or more vector instructions to the first processor for execution and one or more vector instructions to the second processor for execution and, when the computing system is in a ganged mode of operation, issue an issue group of vector instructions for execution to a morphed processor formed from the first and second processor, wherein the issue group comprises instructions issued in a single cycle;

wherein each of the first and second processors is configured to, when the computing system is in the base mode of operation, cascade execution of its respective one or more vector instructions, using at least one of the instruction queue and the target delay queue;

wherein the morphed processor is configured to, when the computing system is in the ganged mode of operation, cascade execution of the issue group of vector instructions by increasing a queue depth of at least one of the instruction queue and the target delay queue of at least one of the first processor and the second processor.

17. The computing system of claim 16, wherein the first and second processors each execute vector instructions in a concurrent manner with respect to each other processor when the computing system is in the base mode of operation.

18. The computing system of claim 16, cascading execution comprises commencing execution of vector instructions in a common issue group of vector instructions in a delayed manner with respect to each other when the computing system is in the ganged mode of operation.

19. The computing system of claim 16, wherein the scheduling logic shares a printed circuit board with the first processor.

20. The computing system of claim 16, further comprising a mechanism controllable by a software instruction to select between the base and ganged operating modes.

* * * * *